United States Patent [19]

Hinn

[11] 4,387,405

[45] Jun. 7, 1983

[54] AUTOMATIC KINESCOPE BIAS CONTROL SYSTEM WITH DIGITAL SIGNAL PROCESSING

[75] Inventor: Werner Hinn, Zollikerberg, Switzerland

[73] Assignee: RCA Corporation, New York, N.Y.

[21] Appl. No.: 295,118

[22] Filed: Aug. 21, 1981

[30] Foreign Application Priority Data

Jan. 26, 1971 [GB] United Kingdom ............... 8102271

[51] Int. Cl.³ .................. H04N 5/68; H04N 9/20; H04N 9/535
[52] U.S. Cl. .................................. 358/243; 358/27; 358/74; 358/34
[58] Field of Search ................. 358/25, 27, 34, 64, 358/65, 74, 168, 169, 171, 172, 242, 243

[56] References Cited

U.S. PATENT DOCUMENTS

| 3,558,817 | 1/1971 | Avoort et al. | 178/7.5 |
| 4,012,775 | 3/1977 | Smith | 358/29 |
| 4,263,622 | 4/1981 | Hinn | 358/242 |
| 4,331,982 | 5/1982 | Parker | 358/243 |

OTHER PUBLICATIONS

Article, "Permanent Color Truth", by E. A. Jensen (from a publication by Bang and Olufsen, Denmark).
Report, "Towards True Color Stability in Television", by A. Lavigne (Videocolor S.A., Paris, France, No. 1600, Jun. 1978).
Article, "Color Receiver Design", by E. A. Jensen, (Wireless World, Jul. 1978).
Article by E. Gublass, ("Bildrohrenasteuerung . . . "), published in Funkschau, (1979, pp. 674–678).

*Primary Examiner*—Tommy P. Chin
*Attorney, Agent, or Firm*—Eugene M. Whitacre; Paul J. Rasmussen; Ronald H. Kurdyla

[57] ABSTRACT

Apparatus is disclosed in a video signal processing system for automatically monitoring and controlling the blanking (black) current level of an image reproducing kinescope. A kinescope cathode output signal proportional to the level of cathode black level current conduction is induced during periodic monitoring intervals during which image signals are absent. The cathode signal is induced in response to a grid drive pulse applied during the monitoring intervals. The induced cathode signal is processed by a digital signal processing network to produce incremental bias control voltage steps for modifying the cathode bias, if necessary, in a direction to produce a desired cathode black current level. In addition, there is disclosed a special form of grid drive pulse which serves to prevent system "hunting" in the vicinity of the correct cathode bias.

23 Claims, 21 Drawing Figures

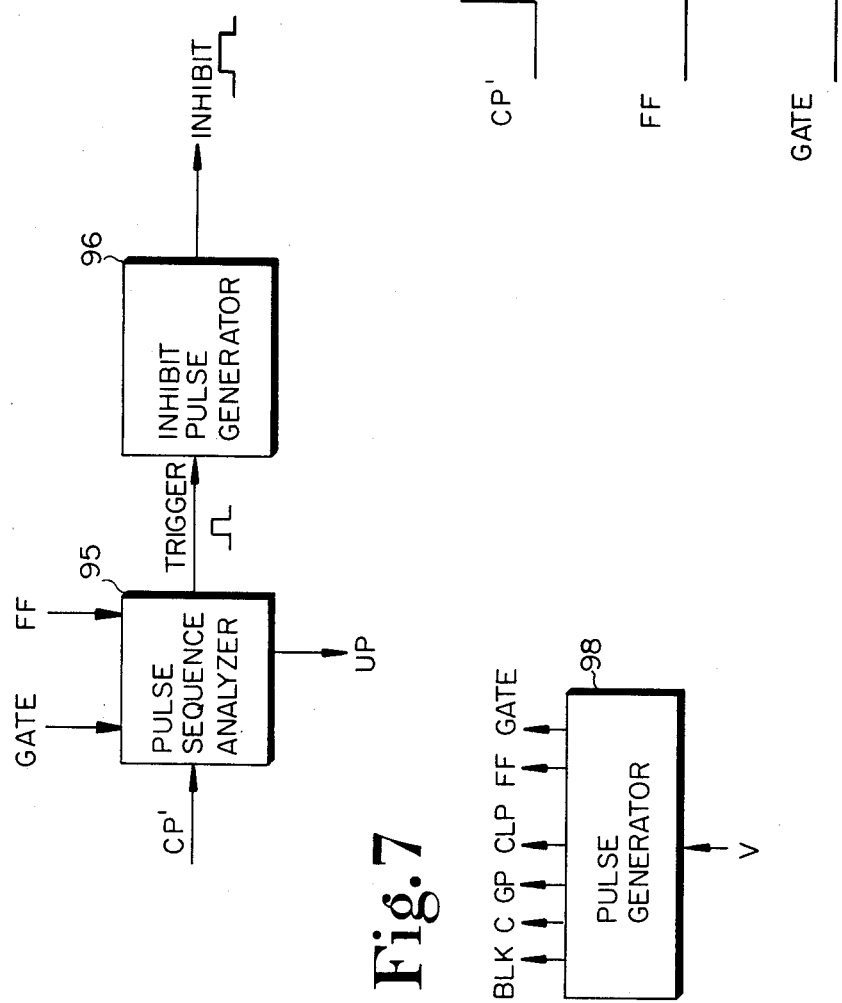

AUTOMATIC KINESCOPE BIAS CONTROL SYSTEM WITH DIGITAL SIGNAL PROCESSING

This invention relates to apparatus for automatically controlling the bias of an image reproducing kinescope in a video signal processing system such as a color television receiver or an equivalent system, in order to establish proper blanking current levels for the electron guns of the kinescope. In particular, this invention concerns such automatic bias control apparatus including a digital signal processor for developing bias control voltages to establish the proper blanking current levels.

A color image reproducing kinescope included in a color television receiver comprises a plurality of electron guns each energized by red, green and blue color representative signals derived from a composite color television signal. Optimum reproduction of a color image requires that the relative proportions of the color representative signals be correct at all kinescope drive levels from white through gray to black, at which level the three electron guns should exhibit significantly reduced conduction or be cut-off.

The optimum reproduction of a color picture and gray scale tracking of the kinescope are impaired when the biases of the electron guns vary from desired levels, causing unwanted kinescope blanking level (black level) errors to be produced. These errors are visible as a color tint on a displayed monochrome picture, and also upset the color fidelity of a displayed color image. Such errors can be caused by a variety of factors, including variations in the operating characteristics of the kinescope and associated circuits (e.g., due to aging), temperature effects, and momentary kinescope "flashovers."

Since it is desirable to assure that the proportioning of the color signals to the kinescope is correct at all picture brightness levels, color television receivers commonly include provisions for adjusting the kinescope and associated circuits in a set-up or service operating mode of the receiver in accordance with well known procedures. Briefly, a service switch with "normal" and "service" positions is operatively associated with the receiver signal processing circuits and the kinescope. In the "service" position, video signals are decoupled from the kinescope and vertical scan is collapsed. The bias of each electron gun is then adjusted to establish a desired blanking current (e.g., a few microamperes) for each electron gun. This adjustment ensures that the kinescope is properly blanked in the absence of an applied video signal or in response to a black reference level of the video signal, and also ensures a proper proportion of color signals at all brightness levels. The kinescope driver circuits associated with each electron gun are then adjusted for a desired gain (e.g., to compensate for kinescope phosphor inefficiencies) to assure a proper proportion of red, green and blue signal drive when the receiver operates normally.

The kinescope blanking adjustment is time-consuming and inconvenient, and typically should be performed several times during the life of the kinescope. In addition, the kinescope blanking and gain adjustments ofter interact with each other, thereby requiring that successive adjustments be made. Therefore, it is advantageous to eliminate the need for this adjustment such as by having this adjustment performed automatically by circuits within the receiver.

Various automatic kinescope bias control systems employing analog signal processing techniques are known. The known systems typically measure the value of a very small cathode blanking current periodically during a given interval (e.g., occurring within a vertical image blanking interval of the television signal when picture information is absent) when a suitable (black) reference level signal is applied to an intensity control electrode of the kinescope. A derived control voltage is used to correct the biasing of a kinescope driver amplifier to produce a desired level of cathode blanking current. However, the known analog systems suffer from disadvantages which are avoided by an arrangement according to the present invention.

Known systems employing analog signal processing techniques typically perform the following functions. The cathode blanking level current is sensed, and a proportional cathode signal is derived, during cathode blanking current intervals. The cathode signal is then filtered to develop a voltage proportional to the magnitude of the cathode signal. A DC bias control voltage is obtained by additional filtering, and is applied to the kinescope driver amplifier via a feedback control loop so as to correct for any kinescope biasing error and associated cathode black level current error.

The control loop serves to stabilize the cathode black current level at a desired correct value. The accuracy of the control mechanism is a function of the control loop gain, which is on the order of 70 db for a typical analog system. Highly accurate bias control requires high control loop gain. However, a high gain control loop can exhibit instabilities (e.g., random fluctuations or oscillations of the cathode bias level) in large part due to the one or more filtering functions which are performed to develop the DC bias control voltage. These filtering functions each utilize RC time constant networks which introduce signal processing delays and phase shifts in the control loop, which tend to compromise the stability of the control loop.

In accordance with the invention, the network for generating the bias control voltage comprises a digital signal processing network. An automatic kinescope bias control system employing the digital signal processor offers precise kinescope biasing control, is stable with very high control loop gains, (e.g., on the order of 150 db to 200 db), and is not prone to producing random fluctuations or oscillation of the cathode bias level. The system does not require integrating or storage capacitors (e.g., for filtering), and can be readily fabricated as an integrated circuit. In addition, the digital processor requires only inexpensive, low power, low speed logic circuits.

Specifically, the digital processor senses the condition of the amplitude of a sequence of periodically derived signal which are proportional to the level of blanking current conducted by the kinescope cathode. The digital processor develops a first control signal when the amplitudes of a sequence of derived signals corresponds to correct cathode bias, and a second control signal when the amplitudes of a sequence of derived signals corresponds to a deviation from correct bias. The second control signal enables a bias voltage generator to develop an incrementally changing bias control voltage which modifies the cathode voltage until a correct cathode bias voltage and corresponding blanking current level are obtained.

In accordance with a feature of the invention, the derived signal corresponds to periodically recurring cathode pulses which are induced during signal blanking intervals in response to periodic grid excitation pulses.

In accordance with another feature of the invention, a prescribed amplitude offset is imparted to the derived signals such that adjacent derived signals within a sequence of derived signals mutually differ in amplitude by an amount including the offset, to prevent system hunting in the vicinity of correct bias.

In the drawing:

FIG. 7 depicts a block diagram of another version of the digital signal processor included in the cathode pulse processor of FIG. 1;

FIG. 8 illustrates timing signal waveforms helpful in understanding the operation of the arrangement of FIG. 7;

Figure 1:
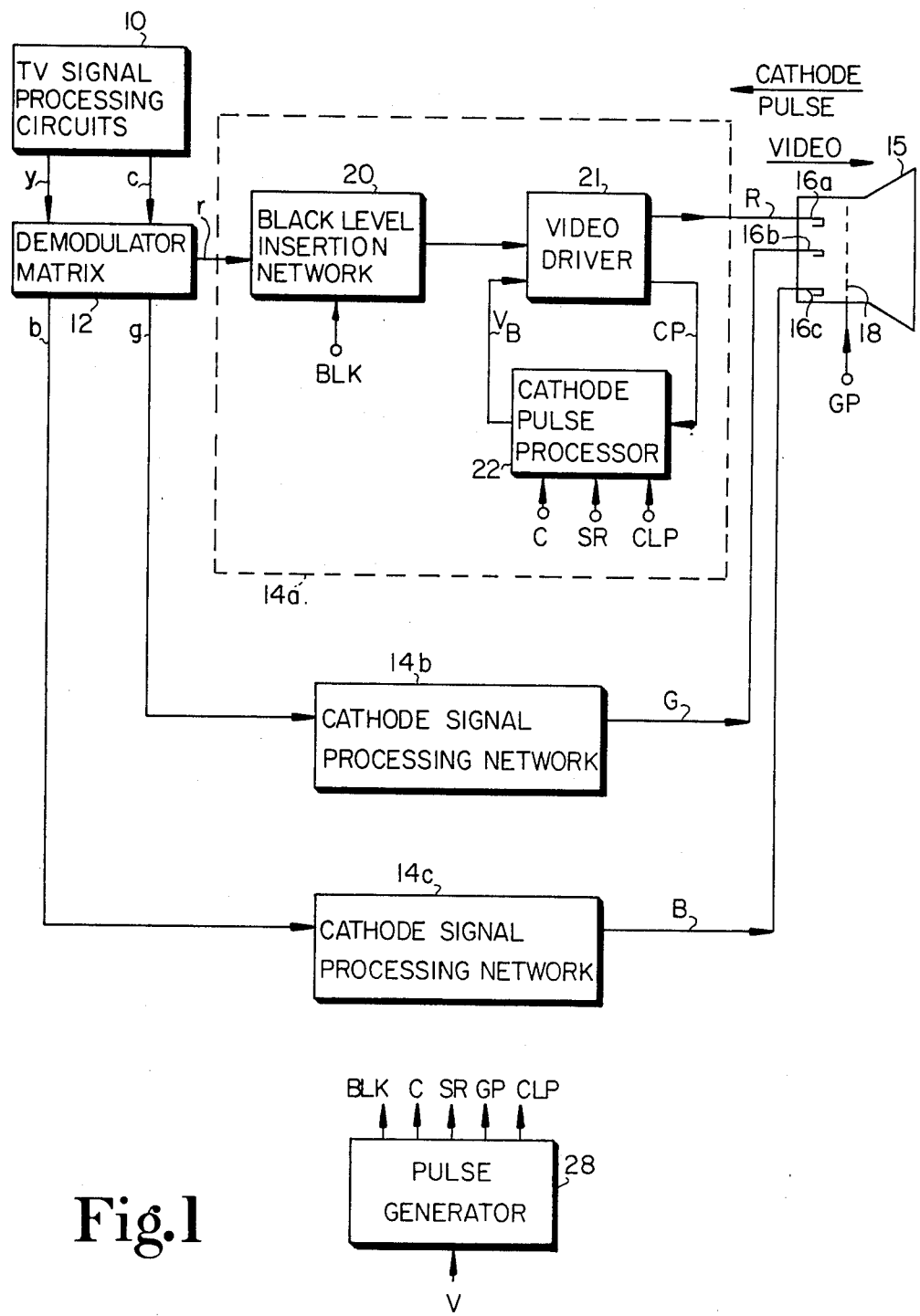
FIG. 1 shows a block diagram of a portion of a color television receiver including video driver and cathode pulse processor apparatus in an automatic kinescope bias control system according to the present invention.

In FIG. 1, television signal processing circuits 10 (e.g., including video detector, amplifier and filter stages) provide separated luminance (Y) and chrominance (C) components of a composite color television signal to a demodulator-matrix 12. Matrix 12 provides output low level color image representative signals r, g and b. These signals are amplified and otherwise processed by circuits within cathode signal processing networks 14a, 14b and 14c, respectively, which supply high level amplified color image signals R, G and B to respective cathode intensity control electrodes 16a, 16b and 16c of a color kinescope 15. In this example, kinescope 15 is of the self-converging in-line gun type with a commonly energized grid 18 associated with each of the electron guns comprising cathode electrodes 16a, 16b and 16c.

Cathode signal processing networks 14a, 14b and 14c are similar in this embodiment. Therefore, the following discussion of the construction and operation of processing network 14a also applies to networks 14b and 14c.

In network 14a, a black level insertion network 20 (e.g., comprising an electronic switch) couples and decouples the r signal output from matrix 12 to a video signal input of a kinescope driver 21 in response to a timing signal BLK. Driver stage 21 includes a signal amplification network for developing high level output signal R which is applied to kinescope cathode 16a. Another output of driver 21 is coupled to an input of a cathode pulse processor 22. This output of driver 21 provides induced cathode pulses (CP) during cathode current monitoring intervals, as will be discussed. Processor 22 is timed to operate in response to timing signals C, SR and CLP to produce an output bias control signal $V_B$ which is supplied to a bias control input of driver 21 for modifying the bias of the amplifier circuits within driver 21 to control the blanking (black) level current conducted by cathode 16a, as will also be discussed.

A pulse generator 28 responds to vertical retrace blanking signals V derived from vertical deflection circuits of the receiver for generating timing signals BLK, C, SR and CLP. Signal V recurs at a 60 Hz. rate for a television receiver according to NTSC broadcast television signal standards in the United States, and at a 50 Hz. rate according to PAL television standards. Unit 28 also generates an output grid drive voltage pulse GP during an interval when the cathode blanking current of kinescope 15 is to be monitored. The output of unit 28 from which signal GP is provided also supplies an appropriate bias voltage for grid 18 (substantially zero volts in this example) at times other than the grid pulse interval.

The kinescope cathode current monitoring interval occurs after the end of vertical retrace blanking, but before the beginning of the picture interval of the television signal containing picture information to be displayed. The monitoring interval occurs during a portion of a larger time interval that encompasses several horizontal lines during which picture information is absent. However, the operation of monitoring the kinescope cathode blanking current produces no visible effects on a displayed picture since the kinescope is overscanned at this time (i.e., the kinescope electron beam is deflected to strike the face of the kinescope above the picture display area).

Figure 2:
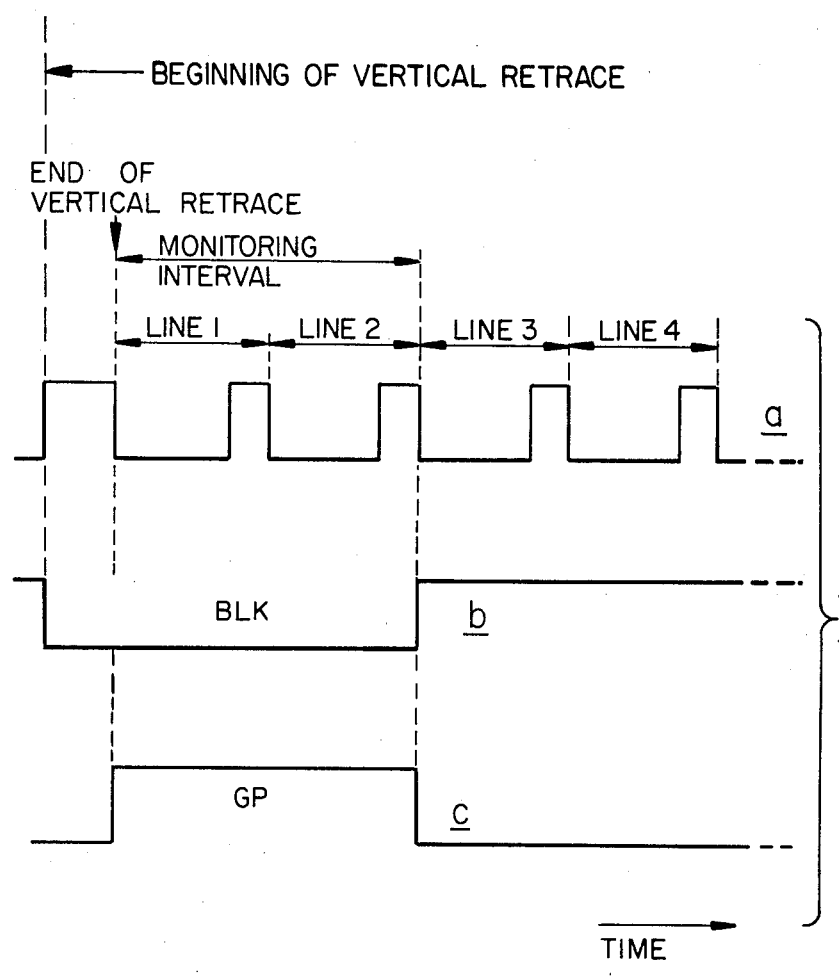
FIG. 2 illustrates waveforms helpful in understanding the operation of the apparatus in FIG. 1.

By way of example, the monitoring interval encompasses the first two horizontal lines that occur after vertical retrace blanking ends, as indicated in waveform a of FIG. 2 with reference to the periodic positive horizontal blanking pulses occurring at the line rate.

The BLK pulse encompassing the vertical retrace and monitoring intervals is shown in waveform b of FIG. 2. The grid drive pulse GP, which encompasses lines 1 and 2 within the monitoring interval after the end of vertical retrace, is shown in waveform c. The grid pulse preferably exhibits a fixed positive amplitude within a range of +5 to +15 volts, depending upon the requirements of a particular system, with respect to a lower pulse pedestal level corresponding to a normal grid bias level of zero volts in this example.

Referring back to FIG. 1, a gate included in black level insertion network 20 is opened in response to signal BLK during the vertical retrace and monitoring interval (FIG. 2) to inhibit conduction of signal r from matrix 12 to driver 21, and a black reference voltage is substituted in the r signal path. This establishes a given black reference bias level at the video signal output of driver 21 which drives kinescope cathode 16a, thereby also providing a quiescent reference level for cathode 16a during the BLK interval. The kinescope functions as a cathode follower in response to grid pulse GP, wherein a similarly phased version of the grid pulse appears at the kinescope cathode electrode during the grid pulse interval. The amplitude of the cathode pulse CP so induced is proportional to the level of the cathode current conduction but is somewhat attenuated relative to the grid pulse due to the relatively low forward transconductance of the kinescope electron gun grid drive characteristic. The magnitude of the cathode pulse is sensed by circuits within processor 22 to determine if the electron gun is conducting a desired amount of black level current, or conducting excessively high or low current.

Output bias control voltage $V_B$ from processor 22 is applied to the bias control input of driver 21 for modifying the DC (bias) operating point of driver 21 when necessary, in a direction to develop a bias level at the signal output of driver 21 sufficient to produce the desired cathode blanking current level by closed loop action. The gate within network 20 returns to the closed position after the monitoring interval ends, whereby color signals from the output of matrix 12 are coupled to the signal input of driver 21.

Figure 3:
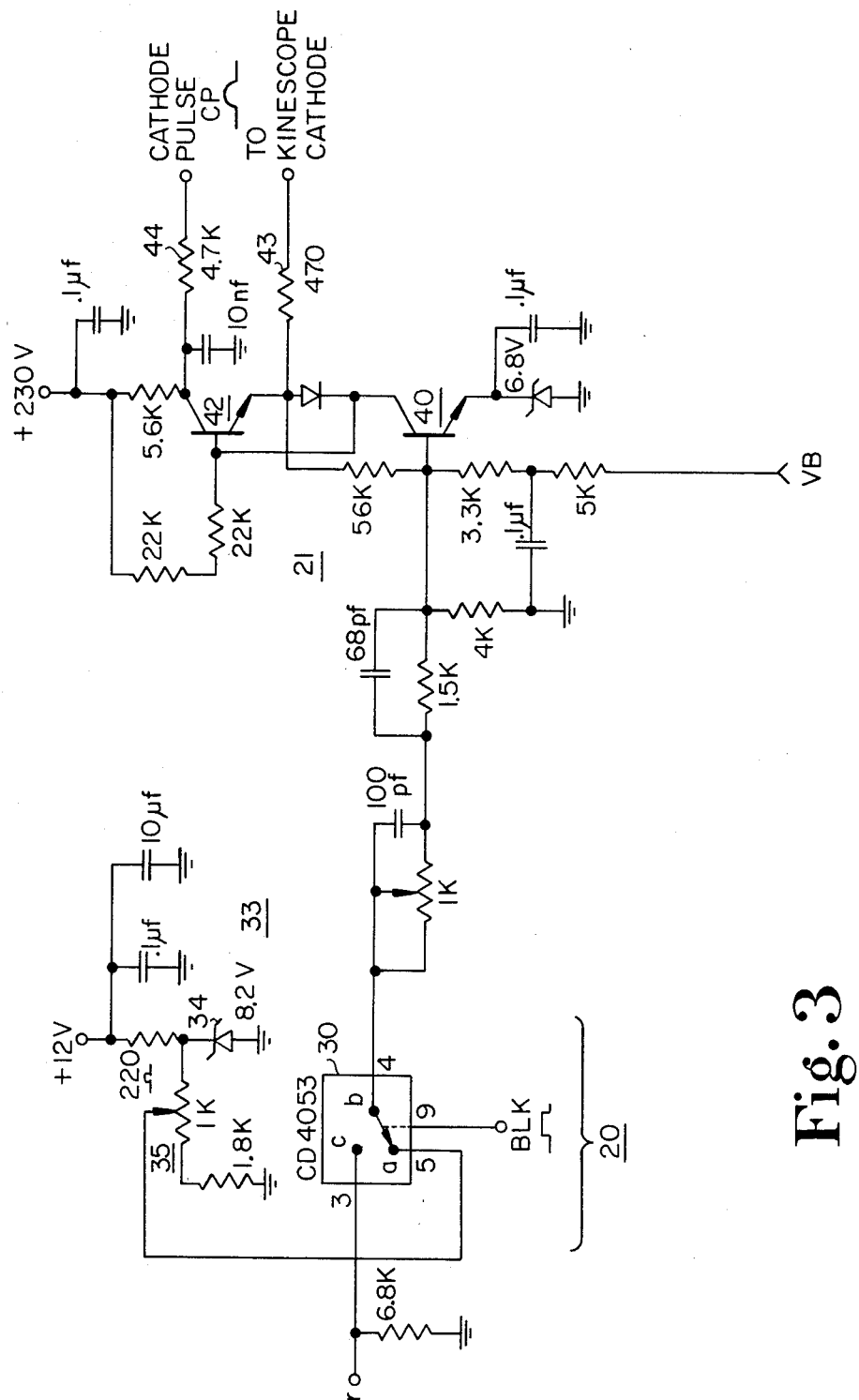
FIG. 3 shows a circuit arrangement of the video driver and associated networks shown in FIG. 1.

FIG. 3 shows circuit details of black level insertion network 20 and video driver 21 of FIG. 1.

In FIG. 3, black level insertion network 20 is shown as comprising a single pole, double throw electronic switch 30, and an associated source of reference voltage 33. Source 33 includes a Zener diode 34 in conjunction with a variable voltage divider including a potentiometer 35. Video driver 21 comprises a cascode amplifier including transistors 40 and 42. Video drive signal R is applied to the kinescope cathode from the emitter circuit of transistor 42 via a resistor 43. The cathode pulse CP induced during the monitoring interval is derived from the collector circuit of transistor 42 via a protection resistor 44. When switch 30 is in the open position (as shown) during the vertical retrace and monitoring interval, video signal r is decoupled from driver 21, and a black level reference voltage from the wiper of potentiometer 35 is applied to the base input circuit of transistor 40 via switch contacts "a" and "b". Accordingly, a reference quiescent level is caused to appear at the emitter of transistor 42 which is DC coupled to the kinescope cathode. At all other times, switch 30 is in the other position wherein video signal r is coupled via switch contacts "c" and "b" to the base input circuit of transistor 40 for amplification by driver 21.

The bias control voltage $V_B$ provided from the output of cathode pulse processor 22 (FIG. 1) is DC coupled to the base input circuit of amplifier transistor 40. Increasing (i.e., more positive) levels of control voltage $V_B$ cause a proportional decrease in the kinescope cathode bias voltage developed at the emitter of transistor 42, which in turn serves to increase the black level current conduction of the kinescope cathode. Conversely, decreasing levels of voltage $V_B$ result in proportionally reduced cathode current conduction.

Cathode pulse CP can also be derived by employing a voltage divider network as disclosed in my U.S. Pat. No. 4,263,622, among other techniques. However, deriving the cathode pulse from the collector output of active load transistor 42 as shown in FIG. 3 is advantageous since it provides a greater cathode pulse amplitude at a lower output impedance.

Figure 4:
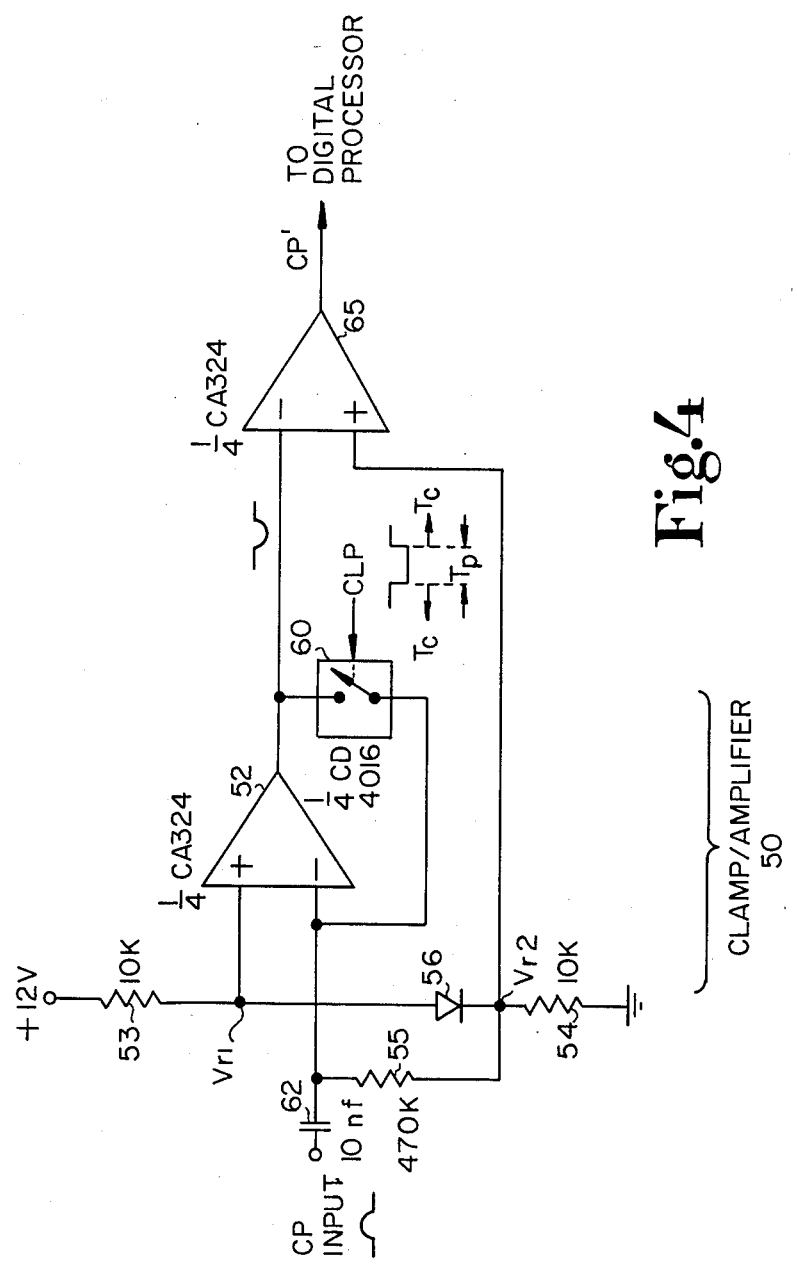
FIG. 4 shows circuit details of a portion of the cathode pulse processor of FIG. 1.

FIG. 4 shows the input circuit of processor 22, comprising a clamping amplifier 50 and a comparator 65.

Clamping amplifier 50 comprises a signal inverting operational amplifier 52 with an inverting signal input (−) and a non-inverting reference input (+). A voltage divider comprising resistors 53, 54 and a diode 56 together with a resistor 55 and a capacitor 62 comprises the input circuit of network 50. A reference voltage $V_{r1}$ developed in the voltage divider is applied to the reference input of amplifier 52. In order for the output signal from amplifier 52 to accurately represent variations in the peak amplitude of cathode pulse CP, it is necessary for the output signal from amplifier 52 to be referenced to a predictable level. This is accomplished by means of a feedback clamping network including a single pole, single throw electronic switch 60 (shown in the open position) and input clamping capacitor 62.

Network 50 operates as follows. At all times except during the cathode pulse interval, switch 60 is rendered conductive (closed) in response to clamp timing control signal CLP. This occurs during times $T_c$ preceding and following the cathode pulse interval Tp. By feedback action the inverting input of amplifier 52 is clamped to the output level of amplifier 52, which is then at $V_{r1}$ reference potential. This feedback action is accomplished by means of switch 60, when closed, in cooperation with input capacitor 62. During cathode pulse interval Tp, switch 60 is rendered non-conductive (open) as shown in response to signal CLP, and an amplified, inverted version of the cathode pulse appears at the output of amplifier 52. The cathode pulse output from amplifier 52 exhibits a (variable) peak-to-peak amplitude with respect to a stable reference level produced by the clamping action. The amplitude of the cathode pulse from amplifier 52 is sensed by comparator 65.

Comparator 65 comprises an operational amplifier with an inverting input (−) coupled to the output of amplifier 52, and a non-inverting input (+) coupled to a reference voltage $V_{r2}$ also generated in the voltage divider comprising resistors 53, 54 and diode 56. The comparator produces a logic "1" output level when the amplitude of the negative-going cathode pulse from network 50 exceeds a level $V_{r1}-V_{r2}$. This occurs when the cathode black current level is greater than the desired current level, corresponding to a condition of low cathode bias voltage. The comparator produces a logic "0" output level when the cathode pulse amplitude from network 50 is less than $V_{r1}-V_{r2}$. This occurs when the cathode black current level is less than the desired level, corresponding to a condition of high cathode bias voltage. Correct cathode biasing is evidence when the cathode pulse peak amplitude is substantially equal to $V_{r1}-V_{r2}$.

In the case of correct cathode bias, the comparator produces a random sequence of output "1" and "0" logic signal levels in response to a sequence of cathode pulses, due to unavoidable random noise which is superimposed on each cathode pulse. This noise originates from the kinescope and amplifier 52, among other sources in the receiver, and causes the amplitude of individual cathode pulses to randomly fluctuate slightly above and below the comparator switching level. The output logic signals produced by comparator 65 are hereinafter referred to as signals CP′, and are suitable for further processing by a digital signal processor as shown in FIG. 5.

The value of reference voltage $V_{r1}$ applied to amplifier 52 exceeds the value of reference voltage $V_{r2}$ applied to comparator 65 by an amount equal to the offset voltage of diode 56. The voltage difference between $V_{r1}$ and $V_{r2}$ in conjunction with the gain of amplifier 52 determines the amount of control over the cathode pulse amplitude that can be provided by the closed control loop. In accordance with the requirements of a particular system, this voltage difference can exhibit a value within a range of from several millivolts to several volts. However, better control of the "black level" cathode current in the vicinity of kinescope cut-off is achieved for smaller values of this voltage difference.

Figure 5:
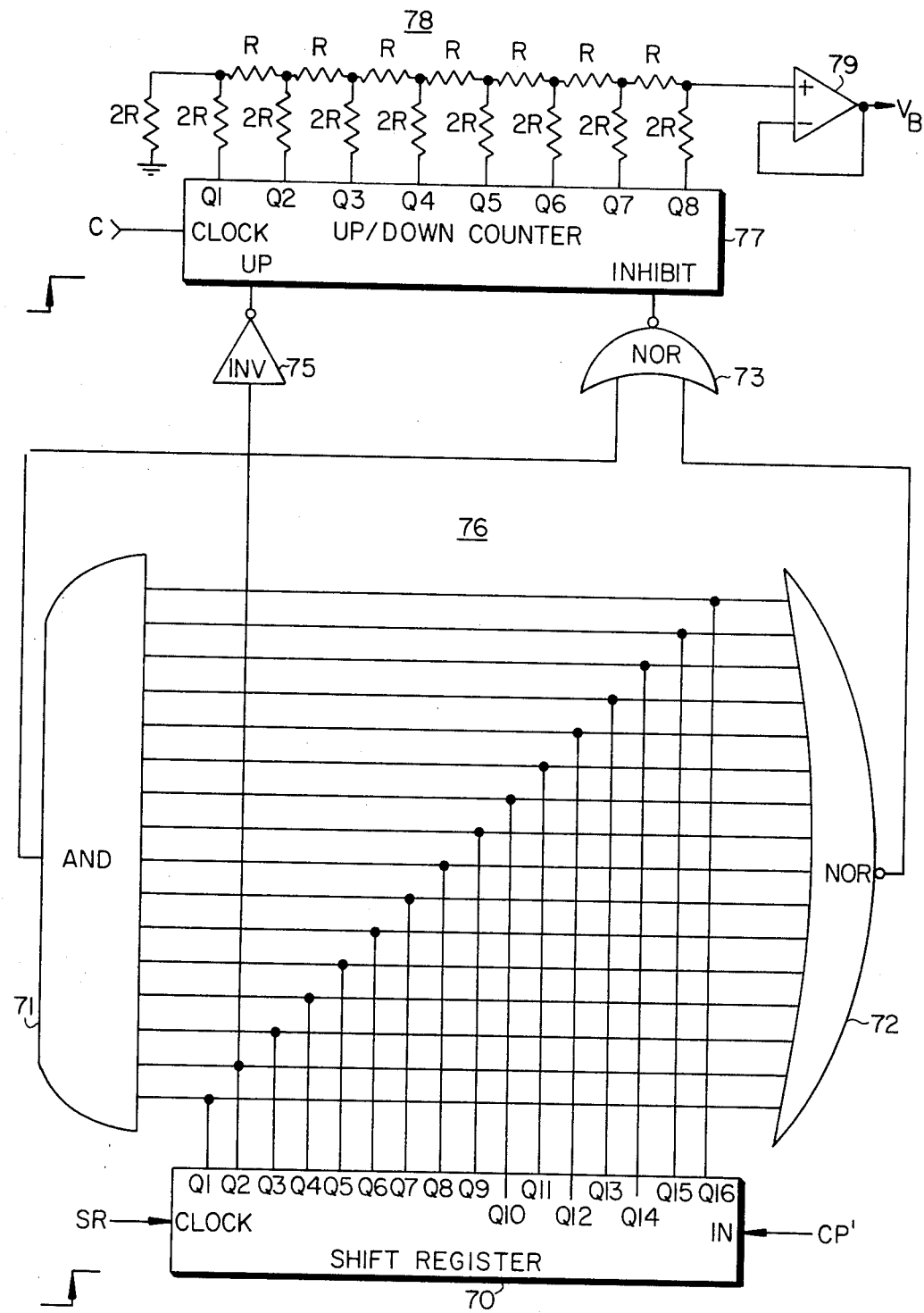
FIG. 5 shows circuit details of a digital signal processor included in the cathode pulse processor.

In FIG. 5, the digital signal processor comprises a 16-bit shift register 70, a logic control network 76 including an AND logic gate 71, first and second NOR logic gates 72 and 73, and an inverter 75, and a counter 77 controlled in response to outputs from control network 76. Gates 71, 72 and 73 are arranged to perform an EXCLUSIVE-OR logic function.

Signals CP' are applied to the serial input of shift register 70, which is clocked during each cathode pulse interval by the triggering (i.e., leading) edge of a clock pulse SR occurring during the cathode pulse interval. Each SR pulse permits either a logic "1" or logic "0" signal level (in accordance with the levels of input pulses CP') to be shifted sequentially into the shift register storage cells, corresponding to outputs $Q_1$ through $Q_{16}$, with shifting occurring from left to right. Control network 76 examines the 16 parallel outputs ($Q_1-Q_{16}$) of shift register 70 by means of 16-input AND gate 71 and NOR gate 72 and develops a control signal at the output of NOR gate 73 for either enabling or disabling the operation of counter 77 via an INHIBIT control input. In this example, inverter 75 responds to the level of the $Q_2$ output of the shift register to develop a control signal for causing counter 77 to either count UP or count DOWN. However, inverter 75 can be arranged to sense other outputs of the shift register.

Counter 77 comprises an 8-bit counter clocked by a pulse timing signal C at the vertical field scanning rate. The triggering edge of this signal must not occur during the cathode pulse interval to avoid changing the kinescope cathode bias during the cathode pulse interval. Thus the triggering edge of this signal can coincide with the end of the cathode pulse interval, or can occur shortly thereafter. The eight outputs of counter 77, $Q_1-Q_8$, are connected to a Digital-to-Analog Converter (DAC) network 78 comprising an R/2R ladder network.

Network 78 generates an output DC voltage ranging from zero volts to +12 volts in response to the state of the counter outputs. Since counter 77 can provide 256 output states (i.e., $2^8$ states), the DAC output voltage resolution, or incremental voltage step, is equal to +46.875 millivolts (i.e., +12 volts/256). The DAC output voltage is coupled via a voltage follower 79 to video driver 21. This voltage, $V_B$, is used for controlling the kinescope cathode bias. In practice, a kinescope black level bias adjustment range of about 40 volts is required at the kinescope cathode electrode (e.g., from +140 volts to +180 volts). In this example, an eight-bit counter as shown permits DC bias level control over this range in increments of 156.26 millivolts (i.e., 40 volts/256 counter states).

Logic control network 76 is arranged to discriminate between three cathode bias conditions and three corresponding output bit patterns of shift register 70. When the cathode current level is too high (i.e., the cathode bias voltage is too low), the switching level of comparator 65 (FIG. 4) will be exceeded and signal CP' will comprise a "1" logic level signal (a positive pulse) for every cathode pulse. Assuming this condition does not change, the outputs of shift register 70 will all be at a "1" logic level after sixteen vertical fields. This condition is sensed by AND gate 71 and NOR gate 72 of network 76, causing a "0" logic signal to be developed at the output of gate 73. In addition, since the $Q_2$ output of shift register 70 is a "1" logic signal, a "0" logic signal is developed at the output of inverter 75. This enables counter 77 to count down. Consequently, bias control voltage $V_B$ decreases in increments of 156.25 millivolts for each vertical field, and the cathode bias voltage proportionally increases in a direction to reduce cathode current, until the correct bias condition is reached.

Conversely, when the cathode current level is too low (i.e., cathode bias voltage is too high), signal CP' will exhibit a "0" logic level for each cathode pulse and the shift register outputs will all be at a "0" logic level after sixteen vertical fields. In this case counter 77 is enabled to count down. Consequently, bias control voltage $V_B$ increases during each vertical field by 156.25 millivolts until the correct bias condition is reached.

When the cathode bias condition is correct, signal CP' will comprise a random series of "1" and "0" logic signals. Accordingly, the outputs of shift register 70 will no longer comprise a uniform series of either "1" or "0" logic levels. This condition when sensed by network 76 will cause gate 73 to produce a logic "1" signal for inhibiting counter 77 and thereby stopping the bias correction process. This result will occur as soon as one of the shift register outputs exhibits a complementary logic level compared to the other outputs (i.e., only when the shift register outputs do not exhibit the same logic level).

Logic control network 76 can be modified to inhibit counter 77 only when a certain fraction (e.g., one half) of the shift register outputs exhibits a given logic state. In addition, to accelerate the correction process while maintaining good resolution, it may be advantageous to apply more than one clock pulse to the counter during each field period when the bias level is far from being correct, and to apply only one clock pulse to the counter when the bias level approaches the correct level to ensure good resolution.

Figure 6:
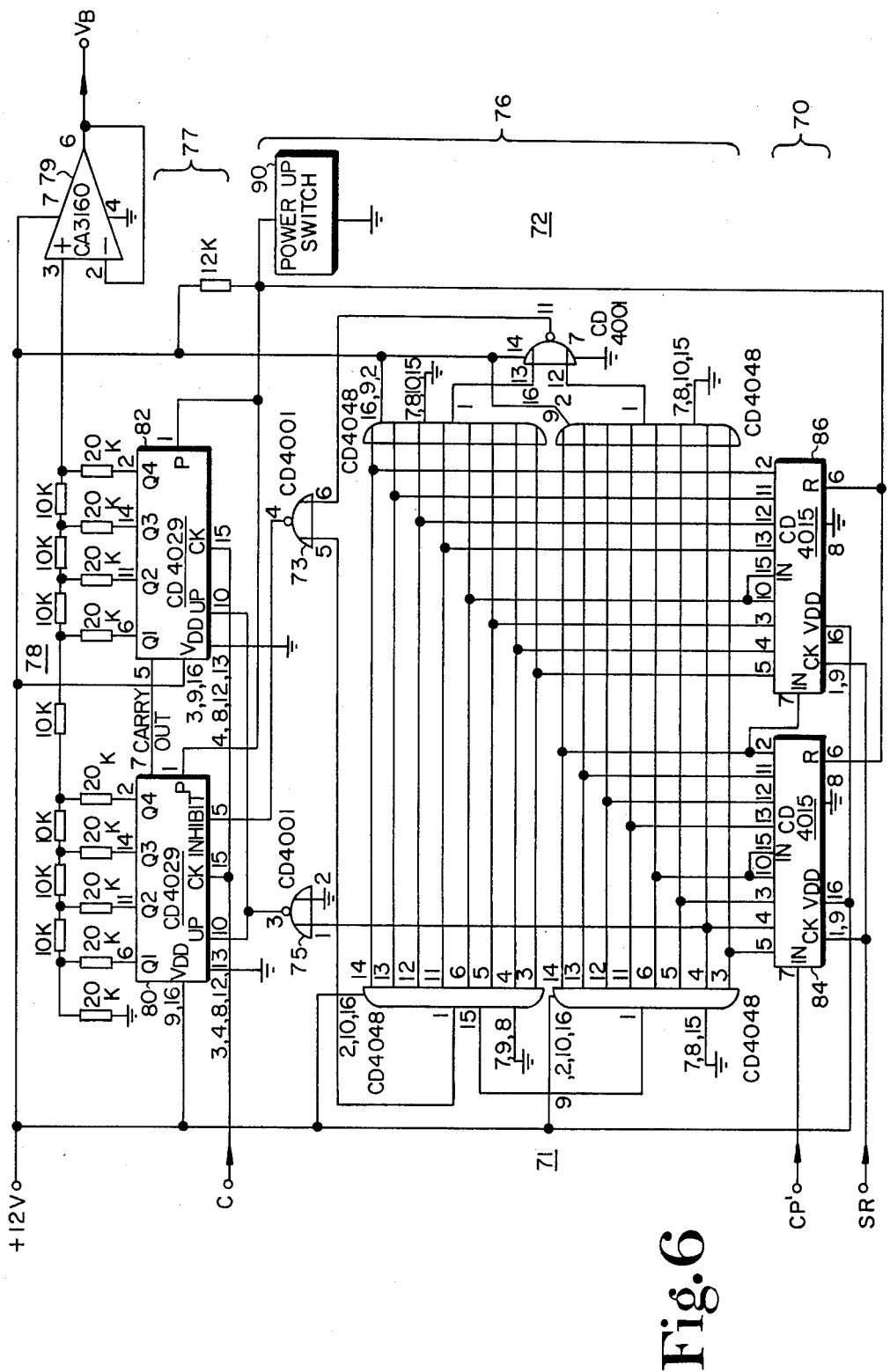
FIG. 6 shows additional details of the digital processor arrangement of FIG. 5.

FIG. 6 shows a more detailed but modified version of the arrangement in FIG. 5, wherein corresponding elements are identified by the same reference number. The arrangement of FIG. 6 resembles and operates substantially the same as the FIG. 5 arrangement, except that provision is included for achieving correct cathode bias sooner after the receiver is initially energized.

In FIG. 6, counter 77 includes first and second presettable counters 80 and 82, and shift register 70 includes first and second resettable shift registers 84 and 86. An electronic "power up" switch 90 (e.g., including a monostable multivibrator) operates in conjunction with the power switch of the receiver and is coupled to the present inputs (P) of counters 80, 82 and to the reset inputs (R) of shift registers 84 and 86. When the receiver is initially energized, switch 90 develops a negative-going pulse for causing shift registers 84 and 86 to be reset, and for presetting counters 80, 82 to the middle of the counting range. For this purpose terminals 4, 12, 13 and 3 (the "jam inputs") of counters 80 and 82 are connected to ground and to the positive voltage supply (+12 volts) as shown such that, upon application of the negative-going pulse to the present counter inputs (P), the outputs of counters 80 and 82 are caused to exhibit logic states corresponding to the middle of the counting range. This produces a bias control voltage $V_B$ at the center of the control range, corresponding to a voltage value likely to be in the vicinity of a value required to achieve correct biasing.

The digital automatic kinescope bias control system as so far described exhibits significantly greater stability than analog systems for the following reasons.

Whenever kinescope cathode bias requires correction, a constant amount of bias correction voltage (156.25 mv.) is applied for each field period, independent of the control loop gain and independent of the size of the error to be corrected. Therefore, more time is required to correct a large error compared to a small error, and there is substantially no chance for correction "overshoot" with associated control loop instability to occur.

As mentioned previously, the correction process continues as long as the shift register outputs all exhibit the same logic state (either "1" or "0"). As soon as the cathode pulse level equals or substantially equals a level corresponding to correct cathode bias and the CP' pulse changes levels with respect to the preceding level (i.e., is complementary with respect to the preceding one), the contents of shift register 70 will no longer all be the same. As a result, the correction process is stopped substantially immediately, without delay. The state of the counter and the bias control voltage are then fixed and the control loop essentially "opens", which advantageously serves to prevent fluctuations of the cathode bias voltage. However, logic control network 76 continues to monitor the shift register outputs during the following field intervals. A continuing random pattern of complementary logic levels at the shift register outputs confirms that cathode biasing is correct, and the correction process remains inhibited.

If a single complementary input signal were caused by a random noise pulse occurring during the cathode pulse interval, the occurrence of another such complementary input signal during a relatively large number of measuring intervals, such as sixteen in this example, is unlikely. Therefore, the correction process begins again sixteen field periods after the noise induced complementary logic signal caused the counter and correction process to stop, and continues until a true random bit pattern is detected at the shift register outputs. Thus, the control process exhibits stable operation even in the presence of random noise which may originate in the control system or in other parts of the receiver.

The system described above, as well as the alternative system to be described subsequently, exhibits a very high control loop gain on the order of 150 db to 200 db. This gain is determined by the gain of clamping amplifier 50 and comparator 65 shown in FIG. 4, and by the gain of video driver 21 in FIG. 3.

The digital signal processor as thus far described operates on the basis of an analysis of a number of N samples, where N equals sixteen in this instance. For this purpose the processor utilizes a sixteen bit shift register as well as sixteen-input AND and NOR gate configuration as shown in FIGS. 5 and 6. Values for N of between four and sixteen are considered suitable for the described system. A value for N of sixteen produces stable operation under very noisy conditions, while a value for N of four is sufficient when the system operates in a low noise environment.

FIGS. 7 and 9-13 show simplified versions of the digital signal processor which perform the same function as the previously described processor but with significantly reduced size, cost and complexity. With reference to FIG. 5 and corresponding FIG. 6, the simplified digital processor to be described replaces shift register 70 and logic control network 76. The UP/DOWN counter 77, digital-to-analog converter 78 and voltage follower 79 from which bias control voltage $V_B$ is supplied, remain unchanged in a system employing the simplified digital processor. In the discussion which follows, the combination of counter 77, digital-to-analog converter 78 and voltage follower 79 are referred to as the "bias control voltage generator".

Referring to FIG. 7, the simplified digital signal processor comprises a pulse sequence analyzer 95 responsive to input signal CP' (as previously described). The pulse sequence analyzer responds to timing signals FF and GATE for producing output control signals UP and TRIGGER. The TRIGGER signal is supplied as an input to an inhibit pulse generator 96 for producing an INHIBIT output signal. The INHIBIT and UP signals are supplied as control inputs to the UP/DOWN counter (i.e., counter 77 in FIGS. 5 and 6) and serve the same purpose as the UP and INHIBIT signals described previously in connection with the arrangement of FIG. 5. Pulse generator 98 in the system of FIG. 7 also produces signals BLK, C, GP and CLP as previously discussed, and additionally produces timing signals GATE and FF. Signal FF essentially corresponds to timing signal SR as described in connection with the system of FIG. 5, and is used to time the operation of a flip-flop circuit in network 95.

The relative timing of signals CP', FF and GATE is shown by waveforms a, b, and c in FIG. 8. Signal CP' is a pulse which has either a "1" logic level, as shown, or a "0" logic level and occurs during the cathode pulse interval. The rising positive edge of signal FF occurs during the cathode pulse interval in order to transfer the logic level manifested by signal CP' into storage circuits within pulse sequence analyzer 95, as will be described. The GATE pulse, which is not required for all of the circuit implementations described below, occurs at the end of the cathode pulse interval or shortly thereafter.

Figure 9:
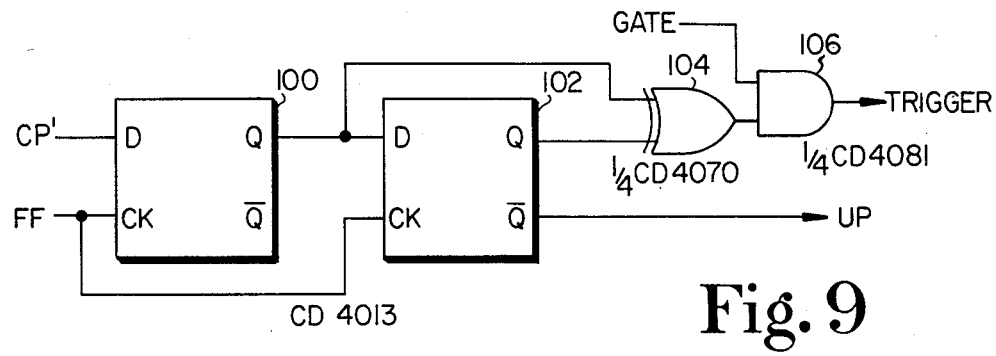
FIGS. 9-11 depict alternative circuit versions of a portion of the arrangement shown in FIG. 7.
Figure 10:
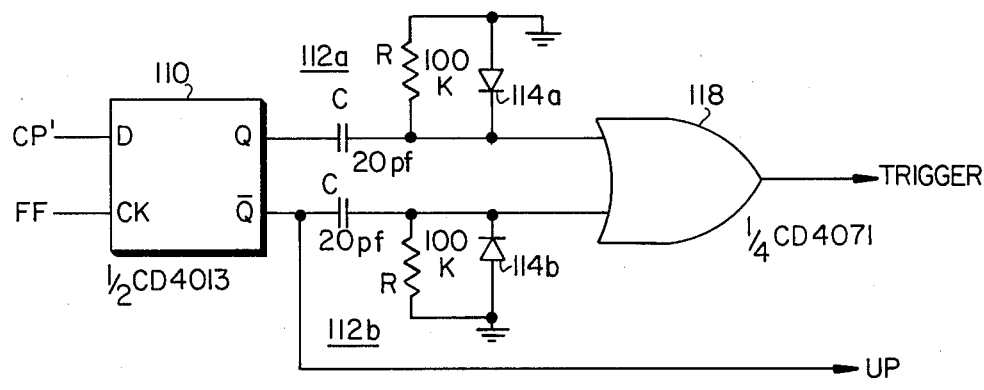
Figure 11:
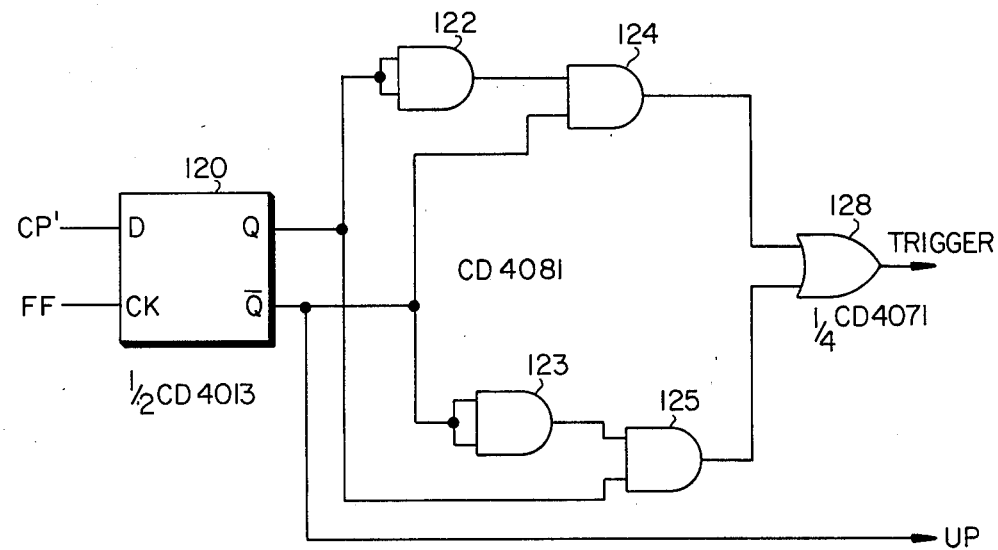

FIGS. 9, 10 and 11 show three circuits suitable for use as pulse sequence analyzer 95. Each of these circuits operates to generate a positive TRIGGER pulse only when signal CP' exhibits a positive logic "1" level during one of two consecutive cathode pulse intervals. Thus the occurrence of a TRIGGER pulse indicates either of two conditions. First, it indicates that signal CP' exhibits a "1" logic level during the present monitoring interval (i.e., the cathode output pulse level exceeded the comparator threshold switching level) but that signal CP' exhibited a "0" logic level during the previous monitoring interval. Second, it indicates that signal CP' exhibits a "0" logic level during the present monitoring interval (i.e., the cathode output pulse level was below the comparator threshold switching level) but that signal CP' exhibited a "1" logic level during the previous monitoring interval. These two conditions indicate that kinescope cathode biasing is likely to be correct. Trigger pulses are not generated when signal CP' exhibits repeated "1" or repeated "0" logic levels in consecutive measuring intervals, corresponding to a condition of incorrect cathode biasing. In this case the UP/DOWN counter is enabled and the bias correction process proceeds as discussed previously, until correct bias is achieved. At this time the TRIGGER pulse is generated, together with a counter INHIBIT signal, and the correction process stops. Thus with the simplified digital processor a decision to correct kinescope cathode bias is made on the basis of two cathode pulse (CP') sampler. However, a number of samples with an integer value greater than two can also be used.

Each of the pulse sequence analyzers in FIGS. 9–11 comprises an input D-type flip-flop clocked at input CK by signal FF during the cathode pulse interval. Signal CP' is applied to the D input. The "Q" flip-flop output exhibits "1" or "0" logic levels when signal CP' exhibits "1" or "0" logic levels, respectively, at the time the positive-going edge of signal FF occurs.

The circuit of FIG. 9 includes a two-bit shift register formed by D-type flip-flops 100 and 102, an EXCLUSIVE-OR gate 104 and an output AND gate 106. The output of gate 104 is at a "1" logic level only when the logic states of flip-flops 100 and 102 are not equal. This occurs only when signal CP' exhibits a "1" logic level during only one of two consecutive cathode pulse intervals. The positive TRIGGER pulse output is generated when this output of gate 104 is gated via AND gate 106 in response to positive pulse signal GATE. The width of the output TRIGGER pulse corresponds to the width of the GATE signal. The GATE pulse serves to pass the information from the output of gate 104 to the output of gate 106 after the end of the cathode pulse monitoring interval. Thus a positive-going signal edge transition appears at the output of AND gate 106 when the output of gate 104 is at a "1" logic level and when the GATE signal is initiated, thereby triggering inhibit generator 96. The UP counter control signal can be derived from the $\overline{Q}$ output of either of flip-flops 100 or 102. The UP signal exhibits a "1" level when signal CP' exhibits a "0" level during two consecutive cathode pulse intervals, indicating that pulses CP' were then absent, whereby the counter counts up to correct a low cathode current condition. Conversely, the UP signal exhibits a "0" level when signal CP' exhibits a "1" level during two consecutive cathode pulse intervals, indicating the presence of pulses CP', whereby the counter counts down to correct a high cathode current condition.

In FIG. 10, whenever complementary outputs Q and $\overline{Q}$ of a flip-flop 110 change logic state in response to a change in the logic state of input signal CP', a positive edge transition appears at either output Q or output $\overline{Q}$. These outputs are coupled to respective RC differentiating networks 112a and 112b, followed by rectifier diodes 114a and 114b which serve to suppress negative-going pulses produced by differentiator action in response to negative-going edge transitions at outputs Q and $\overline{Q}$. Thus only positive pulses produced by differentiator action will be supplied to the inputs of an OR gate 118, which will produce a positive output TRIGGER pulse with each change of state of flip-flop outputs Q and $\overline{Q}$. The UP counter control signal is derived from the $\overline{Q}$ flip-flop output. The RC time constant of each of differentiators 112a and 112b is chosen to produce a positive pulse of a duration (e.g., on the order of one microsecond) sufficient to trigger inhibit pulse generator 96.

FIG. 11 shows an alternative form of the circuit shown in FIG. 10. As in the case of FIG. 14, the circuit of FIG. 15 includes an input D-type flip-flop 120 and an output OR gate 128 for providing the UP and TRIGGER signals. Coupled between the Q and $\overline{Q}$ outputs of flip-flop 102 and the inputs of OR gate 128 is a network comprising AND gates 122, 123 connected as non-inverting gates to which operate as delay elements, and AND gates 124, 125. This circuit operates the same as that of FIG. 10, but produces TRIGGER pulses of shorter duration than those produced by the circuit of FIG. 10.

The bias control voltage generator should be disabled for a given number (e.g., eight or sixteen) of vertical field scanning intervals when a TRIGGER pulse is generated, since the presence of a TRIGGER pulse might indicate that kinescope cathode bias is correct. This is accomplished by the INHIBIT pulse output of inhibit pulse generator 96 in response to the TRIGGER pulse. The duration of the INHIBIT pulse is greater than the duration of the TRIGGER pulse, and corresponds to the duration of the given number of intervals during which the bias control voltage generator is to be disabled.

When biasing is correct, logic level transitions of signal CP' will be produced at random and continuously. Thus the inhibit pulse generator will be triggered continuously, thereby generating a continuous INHIBIT signal for disabling the bias control voltage generator. On the other hand, assume that cathode bias is incorrect and that the bias control voltage generator is operating to correct this condition. If a false, noise induced TRIGGER pulse is caused to be generated before correct cathode bias is achieved, the bias voltage generator will be disabled for the given number of vertical intervals, but will resume proper operation immediately thereafter.

Figure 12:
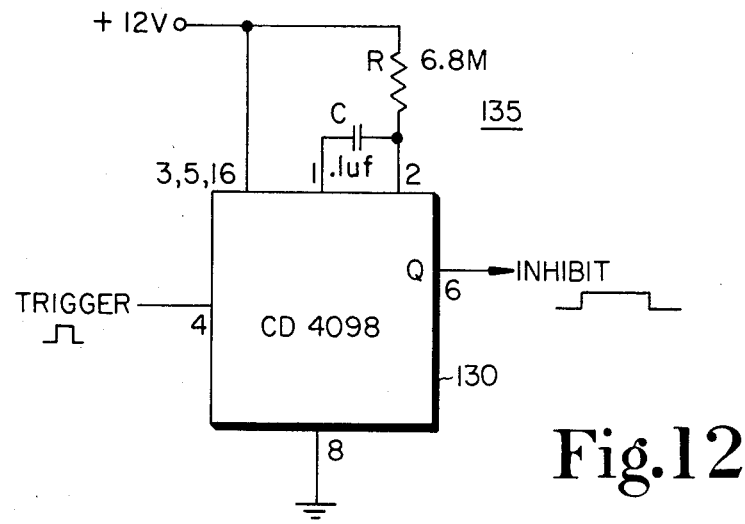
FIGS. 12 and 13 depict alternative circuit versions of another portion of the arrangement of FIG. 7.
Figure 13:
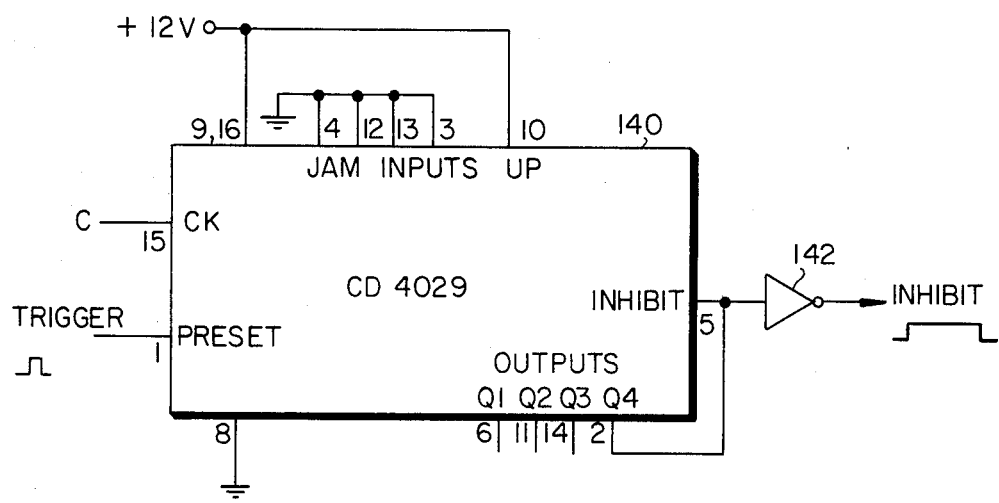

FIGS. 12 and 13 depict two versions of inhibit pulse generator 96. In FIG. 12 the inhibit generator comprises a monostable ("one-shot") multivibrator 130 and an associated RC time constant network 135. In this example the values of the RC timing elements of network 135 establish a width of the counter inhibit pulse corresponding to sixteen vertical field intervals.

The arrangement of FIG. 13 employs a presettable counter 140 which does not require an RC timing network. Each input TRIGGER pulse presets counter 140 to a state which is programmed by biasing the JAM inputs. In this case the JAM inputs are biased at ground potential for programming the counter to exhibit a zero count (i.e., 0000 at outputs $Q_1$ to $Q_4$) when a TRIGGER pulse is applied to the preset input. At this time output $Q_4$ exhibits a "0" logic level and the INHIBIT output of inverter 142 exhibits a "1" logic level for inhibiting the counter. The counter then counts up at the vertical field rate of clock signal C. Output $Q_4$ exhibits a "0" level, and the output of inverter 142 remains at a positive "1" logic level, until the eighth counter clock pulse arrives, at which time the INHIBIT output of inverter 142 exhibits a "0" level whereby the bias control voltage generator is enabled.

The design of the disclosed system involves a consideration of a "sensing threshold" parameter which is related to the function of sensing the cathode black current level, and a "control voltage step" parameter which is related to the function of generating the cathode bias correction voltage.

For the purposes of the following discussion the "control step" is defined as the incremental cathode voltage change caused by a (one step) incremental change in bias control voltage $V_B$, in response to a one step increase or decrease of the up/down counter. In the examples given, the control step is 156 millivolts. In systems employing a six-bit up/down counter in the digital processor, the control step is 625 millivolts (i.e., the 40 volt cathode voltage control range, divided by the 64 counter states).

The "sensing threshold" is defined as the minimum cathode voltage change (i.e., induced cathode pulse CP amplitude change) that the system is able to respond to, and is influenced by the noise range associated with the cathode output pulse. If the cathode pulse amplitude is in the vicinity of and close enough to the threshold switching level of comparator 65 (FIG. 4), meaning that cathode bias is correct or substantially correct, the switching level will fall within the noise range of the induced cathode pulse and the comparator output signal CP' comprises a random sequence of complementary logic levels. The bias correction process is stopped when this condition is sensed. The "sensing threshold" is more specifically defined as the cathode voltage change which produces a change in the induced cathode pulse amplitude equal to the width (magnitude) of the noise range. The waveforms of FIG. 14 are illustrative in this regard.

Figure 14:
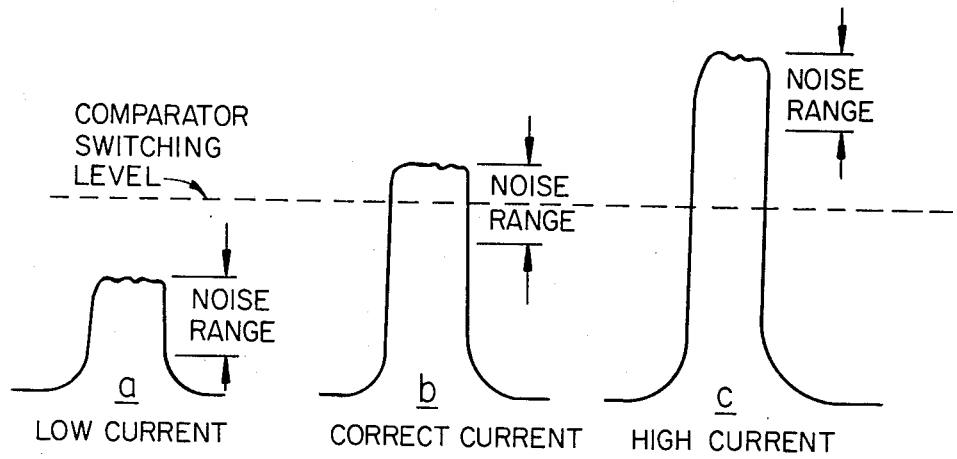
FIGS. 14 and 15-17 illustrate signal waveforms helpful in understanding a feature of the invention.

FIG. 14 shows waveforms a, b, and c of cathode pulse CP associated with three conditions of cathode black level current conduction. Cathode pulse CP of waveform b corresponds to a condition of correct cathode bias. In this case the noise range associated with the cathode pulse encompasses the comparator threshold switching level such that noise effects cause the amplitudes of individual cathode pulses to peak above or below the switching level, thereby generating a random sequence of 1 and 0 logic levels from the comparator output. Cathode pulses CP of waveforms a and c correspond to conditions of low and high cathode current, respectively. In the case of waveform a the cathode pulse amplitude and associated noise range are below the comparator switching level, whereby the comparator output comprises a uniform series of logic "0" levels and the bias correction process is enabled. The correction process is also enabled in the case of waveform c, where the cathode pulse amplitude and associated noise range exceed the comparator switching level and the comparator output comprises a uniform series of logic "1" levels.

In a practical television receiver system, the kinescope cathode voltage can change because of a variety of factors, such as thermally induced drift of the video driver DC output voltage. This in turn causes the cathode black level current and the amplitude of the induced cathode pulse to change. In order to correct this condition, the noise range associated with the cathode pulse amplitude must be shifted entirely above or below the comparator threshold switching level to enable the bias correction network to respond.

In some cases it may be desirable to design the system so that the control step is on the order of 500 or 625 millivolts (e.g., to speed up the bias correction process). However, if the control step is sufficiently large relative to the sensing threshold, the system may undesirably begin to "hunt" whereby the cathode voltage is caused to vary continuously by one control step above and below the desired correct level. The following example illustrates this "hunting" condition.

Assume that the control step (the incremental cathode voltage change) is more than slightly greater than the sensing threshold (the cathode voltage change that produces a cathode pulse amplitude change equal to the width of the noise range). Accordingly, a single control step will cause the cathode pulse amplitude to change by an amount more than slightly greater than the magnitude of the noise range. Also assume that the cathode current and thereby the induced cathode pulse are caused to increase (e.g., due to thermal drift) such that the entire cathode pulse noise range slightly exceeds the comparator switching level. The bias control voltage generator will then develop a control step (incremental cathode voltage change) in a direction to oppose the cathode current increase. However, because the control step is more than slightly greater than the sensing threshold, the control step serves to reduce the cathode pulse amplitude such that the entire cathode pulse noise range is now below the comparator switching level. By a process analogous to the above, in continuance of the "hunting" process, the next control step generated will operate to increase the cathode pulse amplitude such that the entire cathode pulse noise range is again above the switching level.

The described "hunting" phenomenon, and the means by which it is prevented, will now be discussed with reference to the pulse waveforms of FIGS. 15, 16 and 17. Each of these FIGURES depicts seven groups of pulses. For the purpose of the following explanation, each group nominally includes four pulses corresponding to induced cathode pulses as applied to the input of clamping amplifier 50 in FIG. 4. The time between each pulse in a given group corresponds to a vertical field interval. Each group of four pulses (from group 1 to group 7) is typical of a certain cathode bias voltage (from +150.624 volts to +149.688 volts in control steps of 156 millivolts). For a given cathode voltage, the peak amplitudes of the associated cathode pulses can be expected to vary within a noise range NR. The average of the expected amplitude variations within the noise range is shown as AVG.

Figure 15:
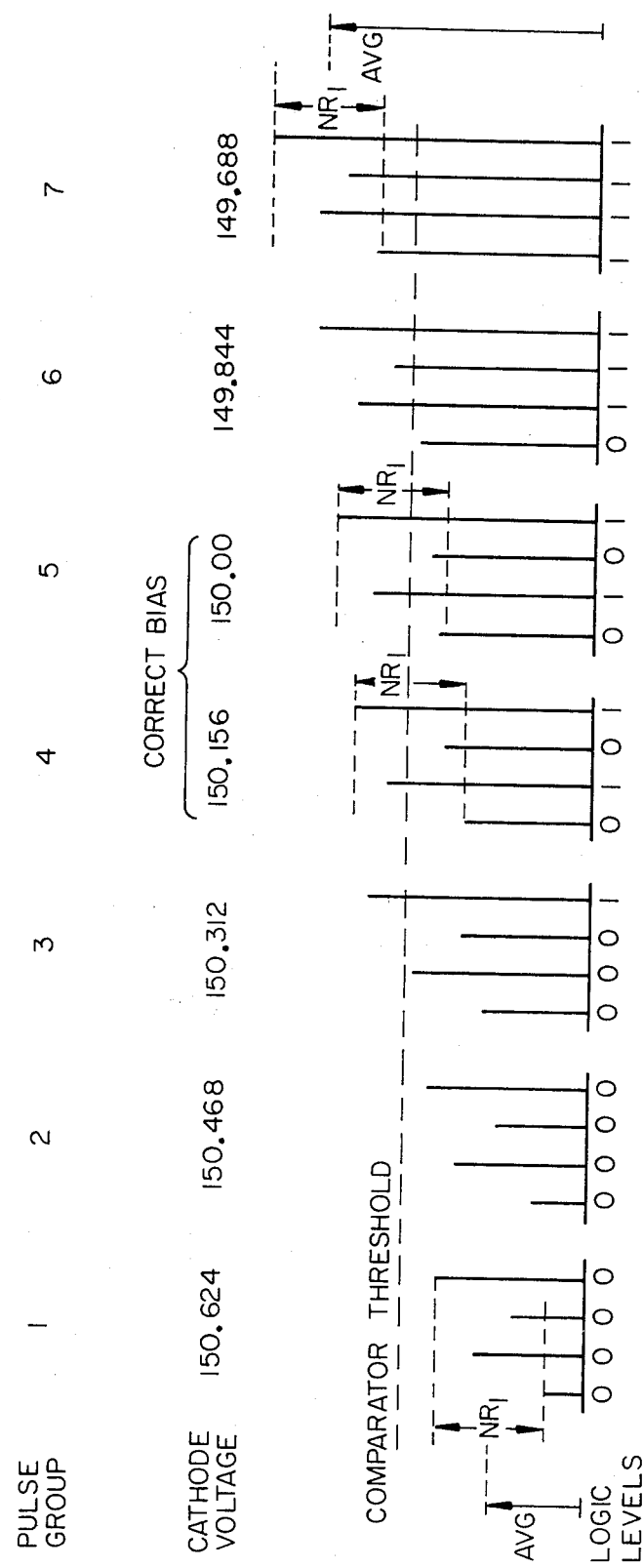

In FIG. 15, the peak amplitudes of the cathode pulses vary within a first noise range $NR_1$ such as may exist in a highly noisy circuit environment. Pulses within group 1 correspond to a condition of high cathode voltage, wherein the comparator output exhibits a uniform series of 0 logic levels (0000) since noise range $NR_1$ of pulses in this group falls below the comparator switching level. Conversely, pulses within group 7 correspond to a condition of low cathode voltage, wherein the comparator output exhibits a uniform sequence of 1 logic levels (1111) since noise range $NR_1$ of pulses in this group is entirely above the threshold level. If either of these conditions persist for a prescribed number of vertical field monitoring intervals (e.g., sixteen), the bias correction voltage generator will be enabled and will incrementally increase or decrease the cathode voltage in control steps of 156 millivolts until the correct cathode bias voltage is achieved. In this example the system will stabilize at a correct bias of +150.156 volts or +150.00 volts (e.g., producing a cathode black current on the order of two microamperes), at which time the associated pulses of groups 4 and 5 exhibit peak amplitudes within noise range $NR_1$ such that the comparator output exhibits a sequence of 1 and 0 logic levels, thereby inhibiting the correction process. In this example the magnitudes of the control step and noise range $NR_1$ are such that "hunting" is not produced. Also in this case, either of the cathode voltages associated with pulse groups 4 or 5 is considered acceptable, although greater accuracy can be achieved if needed by employing a smaller control step.

Figure 16:
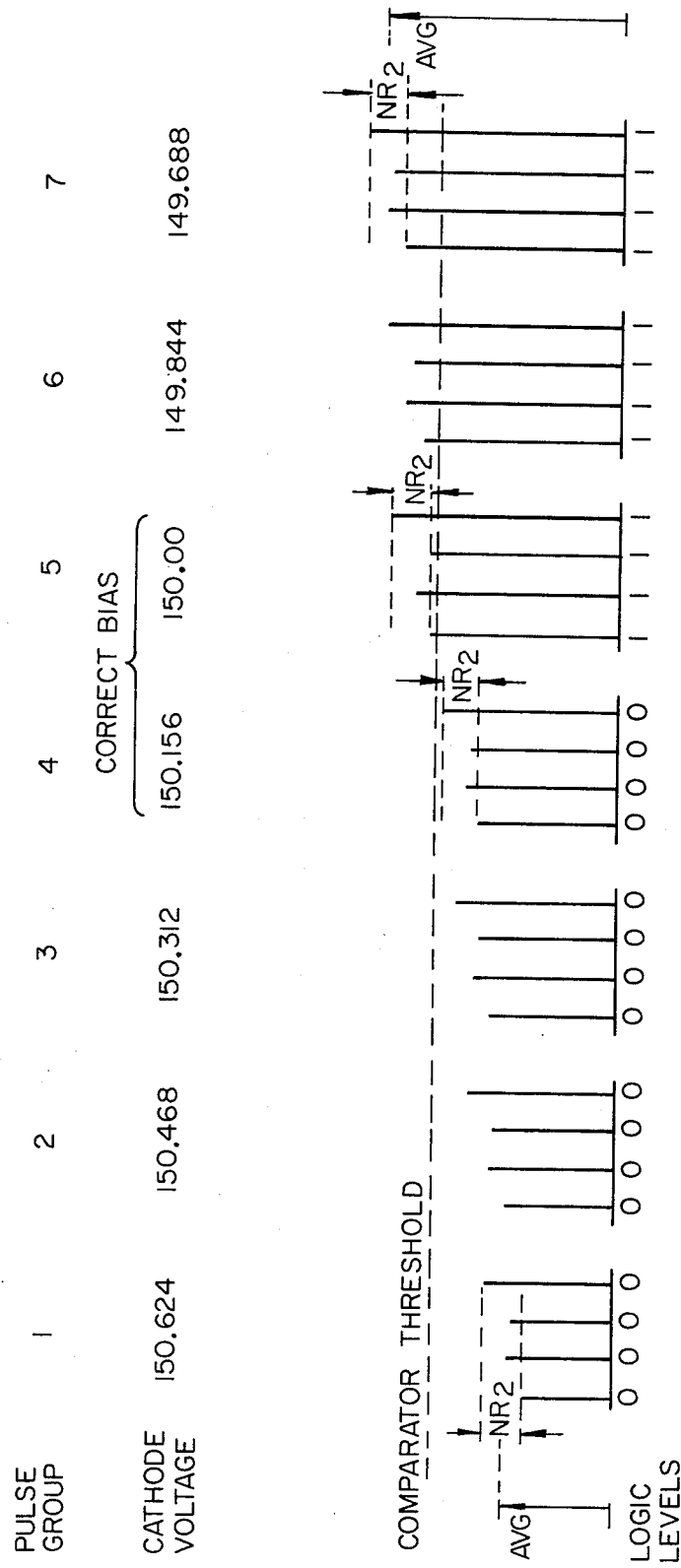

FIG. 16 depicts a situation wherein the magnitudes of the control step (156 millivolts as in FIG. 15) and a noise range $NR_2$ are such that "hunting" is produced. In this case average pulse amplitude AVG is the same as in FIG. 15 for the same cathode voltage, but the noise range $NR_2$ is smaller than noise range $NR_1$ of the FIG. 15 illustration.

In this case "hunting" results, as seen with respect to pulse groups 4 and 5, since a one control step change in the cathode voltage in the vicinity of the correct bias voltage maintains noise range $NR_2$ either fully above or fully below the threshold level. Thus the comparator does not generate a random sequence of 1 and 0 logic levels necessary to disable the correction process to preclude hunting. Instead the comparator output alternates continuously, or "hunts", between a uniform series of 0 logic levels (pulse group 4) and 1 logic levels (pulse group 5).

The "hunting" process noted above is acceptable as long as the control step is too small to cause a visible change in the color balance of an image reproduced by the kinescope. This is usually the case for a control step on the order of 156 millivolts. However, a control step on the order of 500 or 625 millivolts is considered to produce an undesirable visible change in color balance.

The described unwanted "hunting" action can be eliminated or reduced to a tolerable minimum by employing a modified form of grid drive signal GP as will now be discussed.

Figure 19:
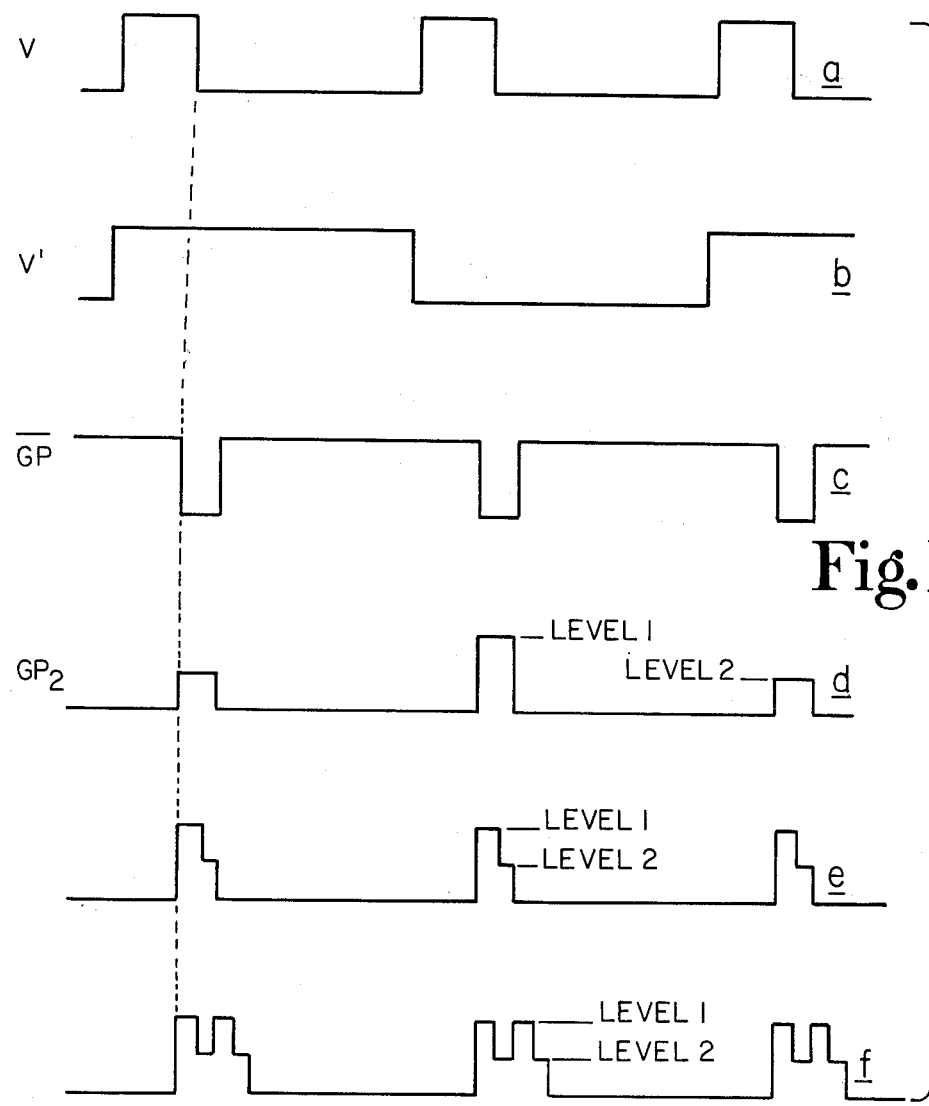
FIG. 19 illustrates signal waveforms associated with the operation of the circuit shown in FIG. 18.

One version of the modified grid drive signal, $GP_2$, is shown as waveform d of FIG. 19. Signal $GP_2$ comprises a two-level grid drive signal with positive pulses occurring at the vertical field rate. Adjacent pulses exhibit mutually different, offset amplitude levels 1 and 2, respectively. Each pair of adjacent pulses recurs at one-half the vertical field rate. The offset between amplitude levels 1 and 2 is fixed and is established as a function of the magnitude of the control step relative to the magnitude of the noise range in a given system.

As seen from the illustrations of FIGS. 15 and 16, "hunting" is produced when the magnitude of the noise range is small relative to the magnitude of the control step (which produces a proportional change in the cathode voltage and cathode pulse amplitude). In such circumstances, hunting can be prevented by dimensioning the amplitude offset of signal $GP_2$, so that the difference between amplitude levels 1 and 2 serves to effectively increase the noise range. This result can be seen from the illustration of FIG. 17.

Figure 17:
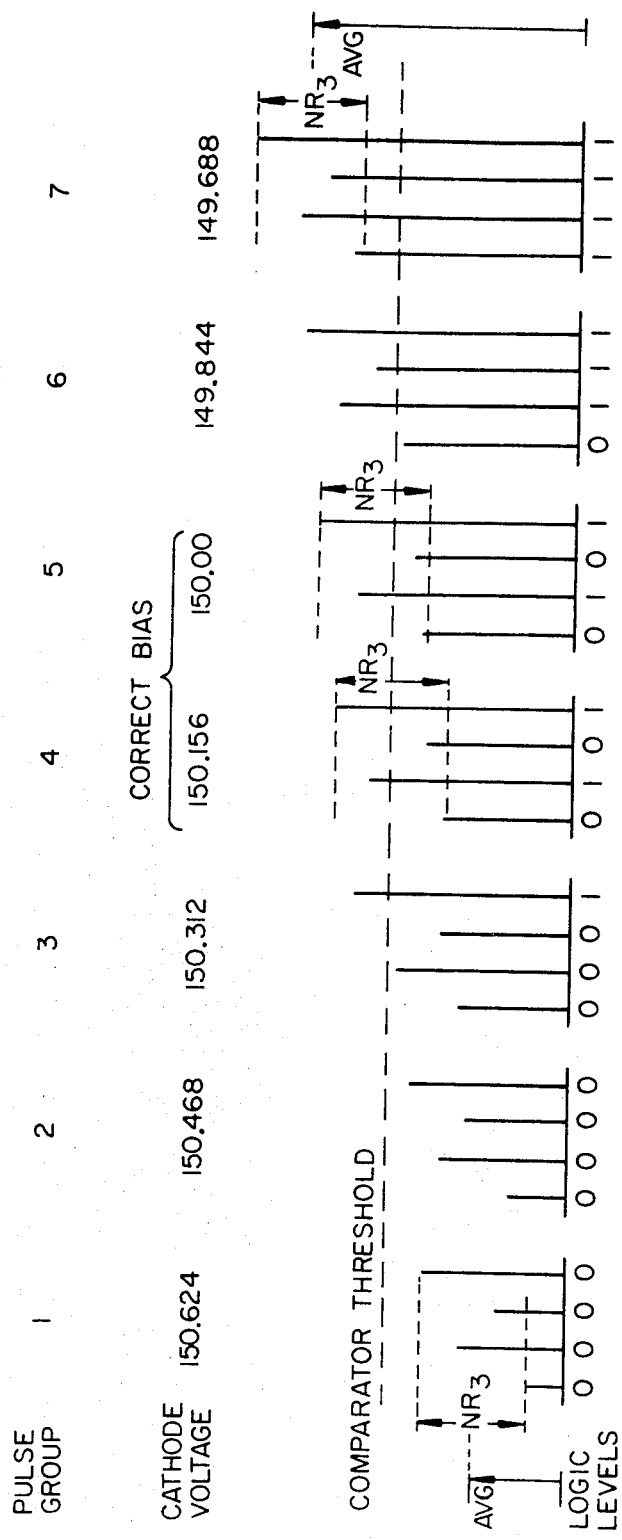

FIG. 17 illustrates a cathode pulse response wherein an "effective" noise range $NR_3$ is associated with the peak amplitudes of the cathode pulses. It is noted that the response of FIG. 17 is for a system where the actual noise range attributable to existing random noise is the same as the relatively small noise range $NR_2$ of FIG. 16. The control voltage step employed in this case is the same as with FIGS. 15 and 16.

In this case, noise range $NR_3$ corresponds to a simulated noise range which is greater than noise range $NR_2$ and, in this example, substantially equals noise range $NR_1$. The simulated noise range is produced by employing signal $GP_2$ with alternating offset levels 1 and 2, which in turn produces cathode pulses such that adjacent cathode pulses exhibit alternating offset peak amplitude levels. The amplitude offset of grid signal $GP_2$ is chosen to produce an amplitude offset between adjacent cathode pulses that is sufficient to effectively increase the actual noise range. Thus simulated noise range $NR_3$ includes an actual noise range component (substantially equal to $NR_2$ in this case) and a simulated noise range component (in this case desirably made equal to the difference between noise ranges $NR_1$ and $NR_2$ to effectively bring noise range $NR_3$ up to the level of noise range $NR_1$). A system response as shown in FIG. 17 therefore effectively corresponds to a system response as shown in FIG. 15, and operates such that "hunting" is prevented as noted in connection with FIG. 15. In other words, simulated noise range $NR_3$ is larger than the change of the average cathode pulse amplitude within the noise range (AVG) produced in response to a change of one control step.

Figure 18:
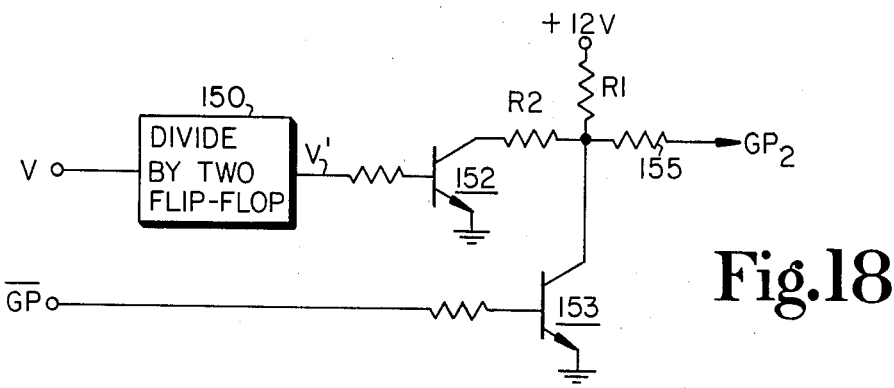
FIG. 18 shows a circuit for generating a particular form of an excitation signal related to a feature of the invention.

A circuit suitable for generating signal $GP_2$ is shown in FIG. 18 and comprises a flip-flop 150 arranged as a frequency divider, transistors 152 and 153, and resistors $R_1$ and $R_2$. Vertical rate signal V at vertical scanning frequency $f_V$ is frequency divided by flip-flop 150 to provide a signal V' at one-half the vertical frequency (½ $f_V$) which is applied to the base input of transistor 152 (see waveforms a and b of FIG. 19). The base input of transistor 153 receives a signal $\overline{GP}$ (waveform c of FIG. 19), corresponding to an inverted version of signal GP as shown in waveform c of FIG. 2. Signal $GP_2$ (waveform d of FIG. 19) is derived from the collector of transistor 153 via a protection resistor 155. The ratio of amplitude level 1 to amplitude level 2 is established by the values of resistors $R_1$ and $R_2$.

Waveforms e and f of FIG. 19 illustrate alternative versions of the modified grid drive signal, wherein each grid pulse exhibits an amplitude offset between levels 1 and 2. The amplitudes of these signals change more than once during each cathode current monitoring interval, thereby permitting the system to develop more information for bias control purposes during each monitoring interval. Systems using modified grid drive signals of this type are capable of a faster control response, and in such systems the input digital shift register would be clocked to receive information during times when the grid pulse levels 1 and 2 are present.

Figure 20:
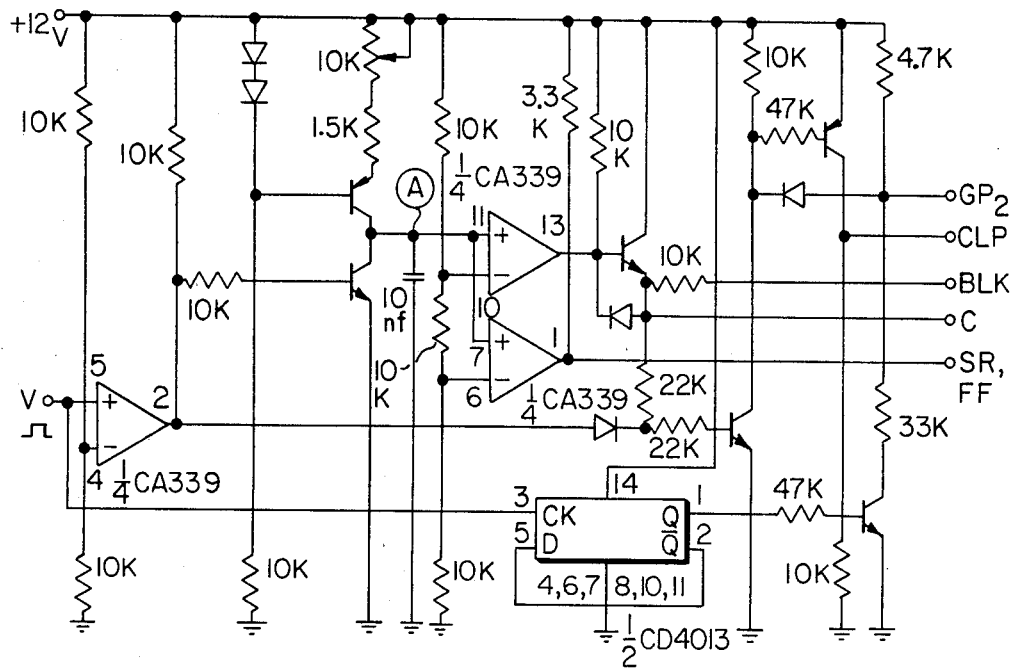
FIG. 20 shows a circuit for generating signals utilized by apparatus according to the invention.
Figure 21:
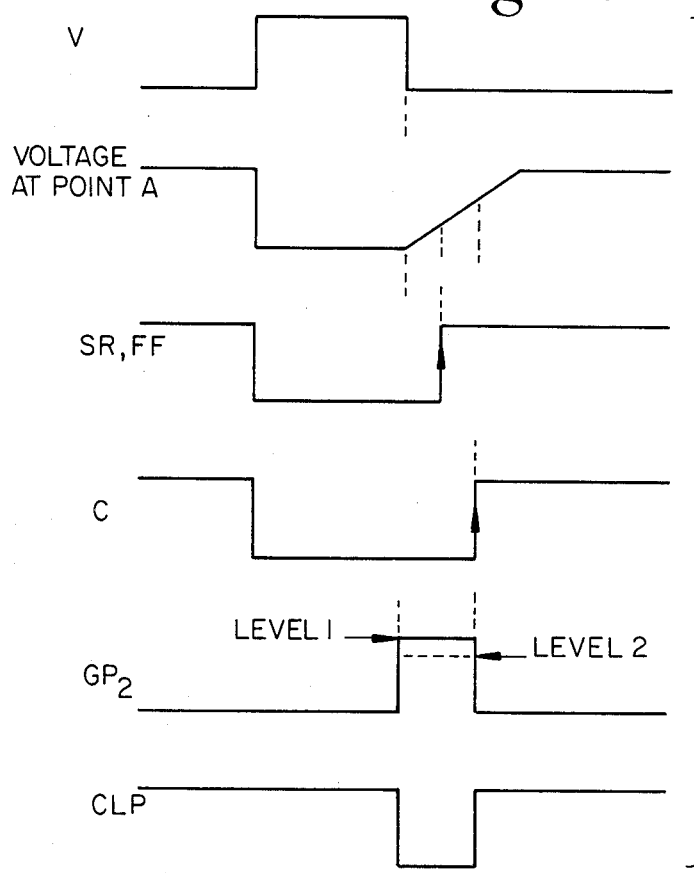
FIG. 21 illustrates signal waveforms associated with the circuit of FIG. 20.

FIG. 20 illustrates a circuit suitable for developing signals CLP, BLK, C, SR and FF, as well as the two-level grid drive signal $GP_2$, in response to input vertical rate signal V. Waveformes of the signals associated with this circuit are shown in FIG. 21. The GATE signal required for the circuit of FIG. 9 must be generated by other means, such as by a "one-shot" monostable multivibrator triggered by the positive-going (leading) edge of signal CLP.

In essence, the described bi-level grid signal technique corresponds to a means for imparting a given amplitude offset to the induced cathode output pulse. However, the described "hunting" effect can be prevented by other means. For example, for a given noise range, the control step can be reduced in magnitude so that the magnitude of the noise range is effectively increased relative to the control step. This alternative requires that the bit-size of the counter in the bias control voltage generator be increased to develop smaller incremental step of control voltage $V_B$, and results in a longer time to achieve correct bias. As other alternatives, the threshold switching level of comparator 65 and the gain of amplifier 50 (FIG. 4) can be switched between two values. However, the bi-level grid pulse technique may be preferred for some systems wherein the grid signal is generated external to the cathode signal processing network (which may comprise an integrated circuit), since the grid signal amplitude offset and thereby the simulated noise range can then be easily set to suit the requirements of a particular system according to the existing random noise level, parasitic signals, and the method used to derive the cathode pulse (which may influence the signal-to-noise ratio).

The CA and CD-type integrated circuits (e.g., types CA 324 and CD 4029) shown in FIGS. 3, 4, 6, 9–13 and 20 are commercially available from the Solid State Division of RCA Corporation, Somerville, N.J.

What is claimed is:

1. In a system for processing an image representative video signal having periodically recurring image display intervals and image blanking intervals during which image information to be displayed is absent, said system including an image display kinescope having an electron gun with cathode and grid intensity control electrodes; and means for coupling video signals to said kinescope electron gun; apparatus for automatically controlling the level of cathode blanking current conducted by said kinescope, comprising:

means for providing a reference bias voltage to said cathode electrode during a monitoring interval within said blanking interval when said blanking current conduction of said kinescope is to be monitored;

means operative during said monitoring interval for deriving a signal proportional to the level of cathode current conducted during said blanking interval; and signal processing means responsive to said derived signal, comprising digital signal processing means for sensing the condition of the level of a sequence of N derived signals, where N is an integer greater than 1, to develop a first signal when a sensed sequence of derived signals corresponds to a condition of desired cathode blanking current level, and a second signal when a sensed sequence of derived signals corresponds to a deviation of said cathode blanking current level from said desired level; and bias control voltage generator means responsive to said second signal for supplying a bias control voltage to said video signal coupling means with a sense for modifying the bias of said kinescope cathode in a direction to adjust said cathode blanking current level toward said desired level.

2. Apparatus according to claim 1, wherein said signal processing means includes means for sensing the magnitude of said derived signal to provide an output signal with a first logic state when said derived signal exhibits a magnitude corresponding to a cathode current level greater than said desired level, and to provide an output signal with a complementary logic state relative to said first logic state when said derived signal exhibits a magnitude corresponding to a cathode current level less than said desired level; and means for supplying said output signals from said sensing means as input signals to said digital signal processing means.

3. Apparatus according to claim 2, wherein said bias control voltage generator means comprises:

a digital counter responsive to input timing signals and having plural outputs, an enable control input for enabling or disabling said counter in response to signals applied thereto, and a count control input for determining the counting sense of said counter in response to signals applied thereto; and a digital-to-analog signal converter responsive to said plural counter outputs for providing said bias control voltage in sequential incremental steps in accordance with the logic state of said counter outputs and the timing of said counter.

4. Apparatus according to claim 3, wherein said counter timing signals occur at the rate of said monitoring intervals.

5. Apparatus according to claim 3, wherein said digital-to-analog converter comprises a resistive voltage divider network with plural inputs coupled respectively to said plural counter outputs, and an output coupled to said video signal coupling means.

6. Apparatus according to claim 3, wherein said digital signal processing means comprises:

a serial shift register timed to operate during intervals when said derived signal is present, and having an input for receiving output signals from said sensing means, and plural outputs; and a logic control network responsive to the logic state of said shift register outputs, and having first and second control outputs respectively coupled to said enable and count control inputs of said counter.

7. Apparatus according to claim 6, wherein said counter is enabled when said first output of said logic control network exhibits one logic state in response to a condition wherein a given number of said plural shift register outputs exhibits one logic state and a given number of said plural shift register outputs exhibits a complementary logic state; and said counter is disabled when said first output of said logic control network exhibits a complementary logic state in the absence of said condition.

8. Apparatus according to claim 7, wherein said counter is enabled for the condition wherein said plural shift register outputs exhibit the same logic state.

9. Apparatus according to claim 8, wherein said second output of said logic control network exhibits one logic state for causing said counter to count in one direction such that said bias control voltage adjusts said kinescope cathode bias in one direction towards the desired level; and said second output of said logic control network exhibits a complementary logic state for causing said counter to count in another direction such that said bias control voltage adjusts said kinescope cathode bias in another direction toward the desired level.

10. Apparatus according to claim 1, wherein said signal processing means comprises:

a signal comparator responsive to a reference signal and to the magnitude of said derived signal for providing an output signal with first or second logic states when said derived signal is sensed as having a magnitude corresponding to a cathode current level greater than or less than said desired level, respectively;

a first digital counter responsive to said comparator output signal, said first counter having plural outputs and being timed to operate during intervals when said derived signal is present;

a logic control network responsive to the logic state of said plural outputs of said first counter for providing first and second logic control output signals;

a second digital counter with enable and count control inputs respectively responsive to said first and second output signals of said logic control network, and having plural outputs;

a digital-to-analog signal converter responsive to said plural outputs of said second counter for providing said bias control voltage in sequential incremental steps in accordance with the logic state of said outputs of said second counter; and wherein said second counter is enabled in response to said first output signal of said logic control network when said plural outputs of said first counter exhibit a first predetermined logic state; said second counter being caused to count up in response to said second output signal from said logic control network when said plural outputs of said first counter exhibit a second predetermined logic state, and being caused to count down in response to said second output signal from said logic control network when said plural outputs of said first counter exhibit a third predetermined logic state.

11. Apparatus according to claim 10, wherein said plural outputs of said first counter correspond in number to said integer N where N is greater than three.

12. Apparatus according to claim 10, and further comprising
means for presetting said second counter to a predetermined point the counting range when said system is initially energized.

13. Apparatus according to claim 12, wherein said second counter is preset to the middle of the counting range such that said bias control voltage is initially established at a mid-range value.

14. Apparatus according to claim 1, wherein
said signal processing means includes sensing means responsive to the magnitude of said derived signal for providing an output signal with first or second logic states when said derived signal is sensed as having a magnitude corresponding to a cathode current level greater or less than said desired level, respectively; and
said digital processing means responds to said output signal from said sensing means for providing said first signal representative of said desired current level condition when output signals from said sensing means exhibit complementary logic states during N consecutive derived signal intervals; and for providing said second signal representative of said deviation from said desired current condition when output signals from said sensing means exhibit the same logic state during N consecutive derived signal intervals.

15. Apparatus according to claim 14, wherein said N consecutive intervals of said derived signal corresponds to two consecutive intervals.

16. Apparatus according to claims 14 or 15 wherein said bias control voltage generator means comprises:
a digital counter responsive to input clock signals and having plural outputs, an enable control input for enabling or disabling said counter in response to signals applied thereto, and a count control input for determining the counting sense of said counter in response to signals applied thereto; and
a digital-to-analog signal converter responsive to said plural counter outputs for providing said bias control voltage in sequential incremental steps in accordance with the logic state of said counter outputs and the clocking of said counter.

17. Apparatus according to claim 16, wherein:
said first and second signals from said digital processing means are applied to said enable control input of said counter for enabling and disabling said counter in response to said first and second signals, respectively; and wherein said digital signal processing means further includes
means for inhibiting said counter for an interval greater than said N intervals in response to said output signals from said sensing means exhibiting complementary logic states during said N consecutive derived signal intervals.

18. Apparatus according to claim 17, wherein
said digital signal processing means supplies a count control output signal to said count control input of said counter, said count control output signal exhibiting one logic state for enabling said counter to count up when said second signal uniformly exhibits one logic state during said N consecutive intervals, and for enabling said counter to count down when said second signal uniformly exhibits a complementary logic state during said N consecutive intervals.

19. Apparatus according to claim 1 and further comprising:
means for imparting a prescribed amplitude offset to said derived signals such that adjacent derived signals within said sequence of N derived signals mutually exhibit a difference in magnitude including said offset.

20. In a system for processing an image representative video signal having periodically recurring image display intervals and image blanking intervals during which image information to be displayed is absent, said system including an image display kinescope having an electron gun with cathode and grid intensity control electrodes; and means for coupling video signals to said cathode electrode; apparatus for automatically controlling the level of cathode blanking current conducted by said kinescope, comprising:
means for providing a reference bias voltage to said cathode electrode during a monitoring interval within said blanking interval when said blanking current conduction of said kinescope is to be monitored;
means for providing an auxiliary signal to said grid electrode with a sense for forward biasing said grid electrode during said monitoring interval;
means operative during said monitoring interval for deriving a signal proportional to the level of cathode current conducted during said blanking interval in response to said auxiliary signal; and
signal processing means responsive to said derived signal, comprising
digital signal processing means for sensing the condition of the level of a sequence of N derived signals, where N is an integer greater than 1, to develop a first signal when a sensed sequence of derived signals corresponds to a condition of desired cathode blanking current level, and a second signal when a sensed sequence of derived signals corresponds to a deviation of said cathode blanking current level from said desired level; and
bias control voltage generator means responsive to said second signal for supplying a bias control voltage to said video signal coupling means with a sense for modifying the bias of said kinescope cathode in a direction to adjust said cathode blanking current level toward said desired level.

21. Apparatus according to claim 20 wherein said auxiliary signal comprises repetitive pulses exhibiting a prescribed amplitude offset such that adjacent pulses within a sequence of N pulses mutually exhibit a difference in magnitude corresponding to said offset; and wherein adjacent derived signals within said sequence of N derived signals mutually exhibit a difference in magnitude including an offset proportional to said prescribed offset.

22. Apparatus according to claim 21, wherein said bias control voltage changes in fixed increments for proportionally modifying said kinescope cathode bias voltage in incremental control voltage steps;

said derived signal exhibits a peak amplitude undesirably subject to variation within a range of amplitudes induced by noise; and said prescribed offset is chosen to establish a given relationship between said control voltage step and said noise induced amplitude range.

23. In a system for processing color image representative video signals having periodically recurring image display intervals and image blanking intervals during which image information to be displayed is absent, said system including a color image display kinescope having plural electron guns each with a cathode eletrode, and an associated grid electrode energized in common with said cathode electrodes; and means for respectively coupling video signals to said cathode electrodes; apparatus separately associated with each of said cathode electrodes for automatically controlling the level of respective cathode blanking currents conducted by said kinescope, each of said apparatus comprising:

means for providing a reference bias voltage to said cathode electrode during a monitoring interval within said blanking interval when said blanking current conduction of said kinescope is to be monitored;

means for providing an auxiliary signal to said grid electrode with a sense for forward biasing said grid electrode during said monitoring interval;

means operative during said monitoring interval for deriving a signal proportional to the level of cathode current conducted during said blanking interval; and signal processing means responsive to said derived signal, comprising digital signal processing means for sensing the condition of the level of a sequence of N derived signals, where N is an integer greater than 1, to develop a first signal when a sensed sequence of derived signals corresponds to a condition of desired cathode blanking current level, and a second signal when a sensed sequence of derived signal corresponds to a deviation of said cathode blanking current level from said desired level; and bias control voltage generator means responsive to said second signal for supplying a bias control voltage to said video signal coupling means with a sense for modifying the bias of said kinescope cathode in a direction to adjust said cathode blanking current level toward said desired level.

* * * * *